US009069380B2

(12) United States Patent
Rahman et al.

(10) Patent No.: US 9,069,380 B2
(45) Date of Patent: Jun. 30, 2015

(54) MEDIA DEVICE, APPLICATION, AND CONTENT MANAGEMENT USING SENSORY INPUT

(75) Inventors: Hosain Sadequr Rahman, San Francisco, CA (US); Richard Lee Drysdale, Santa Cruz, CA (US); Michael Edward Smith Luna, San Jose, CA (US); Scott Fullam, Palo Alto, CA (US); Travis Austin Bogard, San Francisco, CA (US); Jeremiah Robison, San Francisco, CA (US); Max Everett Utter, II, San Francisco, CA (US); Thomas Alan Donaldson, London (GB); Raymond A. Martino, Los Gatos, CA (US)

(73) Assignee: AliphCom, San Francisco, CA (US)

( * ) Notice: Subject to any disclaimer, the term of this patent is extended or adjusted under 35 U.S.C. 154(b) by 616 days.

(21) Appl. No.: 13/181,512

(22) Filed: Jul. 12, 2011

(65) Prior Publication Data

US 2012/0316661 A1 Dec. 13, 2012

Related U.S. Application Data

(63) Continuation-in-part of application No. 13/180,000, filed on Jul. 11, 2011, and a continuation-in-part of application No. 13/180,320, filed on Jul. 11, 2011, and a continuation-in-part of application No. 13/158,372, (Continued)

(51) Int. Cl.

| | |
|---|---|
| ***G06F 17/00*** | (2006.01) |
| ***G06F 3/01*** | (2006.01) |
| ***G06F 1/16*** | (2006.01) |

(52) U.S. Cl.
CPC .............. *G06F 3/011* (2013.01); *G06F 1/1694* (2013.01); *G06F 2203/0381* (2013.01); *G06F 2203/0384* (2013.01)

(58) Field of Classification Search
USPC ............... 700/94; 340/5.1; 702/127, 141, 189
See application file for complete search history.

(56) References Cited

U.S. PATENT DOCUMENTS

| | | | |
|---|---|---|---|
| 3,625,763 | A | 12/1971 | Melillo |
| 3,902,148 | A | 8/1975 | Drees et al. |

(Continued)

FOREIGN PATENT DOCUMENTS

| | | |
|---|---|---|
| CA | 2441962 | 10/2002 |
| WO | PCT/US01/40958 | 12/2001 |

(Continued)

OTHER PUBLICATIONS

U.S. Appl. No. 12/684,881, filed Jul. 14, 2011, Kahn et al.

(Continued)

*Primary Examiner* — Fan Tsang
*Assistant Examiner* — David Siegel
(74) *Attorney, Agent, or Firm* — Kokka & Backus, PC

(57) ABSTRACT

Techniques for media device, application, and content management using sensory input are described, including receiving input from one or more sensors coupled to a data-capable strapband, processing the input to determine a pattern, referencing a pattern library using the pattern, generating a control signal to a media application, the control signal being determined based on whether the pattern matches another pattern in the pattern library, and selecting a media file configured to be presented, the media file being selected using the control signal.

20 Claims, 24 Drawing Sheets

Related U.S. Application Data filed on Jun. 10, 2011, and a continuation-in-part of application No. 13/158,416, filed on Jun. 11, 2011.

(60) Provisional application No. 61/495,995, filed on Jun. 11, 2011, provisional application No. 61/495,994, filed on Jun. 11, 2011, provisional application No. 61/495,997, filed on Jun. 11, 2011, provisional application No. 61/495,996, filed on Jun. 11, 2011.

(56) References Cited

U.S. PATENT DOCUMENTS 4,178,916 A 12/1979 McNamara
4,365,637 A 12/1982 Johnson
4,384,917 A 5/1983 Wensink
4,407,295 A 10/1983 Steuer et al.
4,509,531 A 4/1985 Ward
4,788,583 A 11/1988 Kawahara et al.
4,819,860 A 4/1989 Hargrove et al.
5,019,673 A 5/1991 Juskey et al.
5,050,612 A 9/1991 Matsumura
5,057,457 A 10/1991 Miyahara et al.
5,078,134 A 1/1992 Heilman et al.
5,252,179 A 10/1993 Ellerson et al.
5,379,186 A 1/1995 Gold et al.
5,391,080 A 2/1995 Bernacki et al.
5,546,955 A 8/1996 Wilk
5,593,431 A 1/1997 Sheldon
5,692,501 A 12/1997 Minturn
5,766,496 A 6/1998 Martin
5,795,301 A 8/1998 Yasukawa et al.
5,892,824 A 4/1999 Beatson et al.
5,924,979 A 7/1999 Swedlow et al.
5,938,593 A 8/1999 Ouellette
5,959,316 A 9/1999 Lowery
5,959,363 A 9/1999 Yamada et al.
5,974,262 A 10/1999 Fuller et al.
5,998,867 A 12/1999 Jensen et al.
6,044,297 A 3/2000 Sheldon et al.
6,095,991 A 8/2000 Krausman et al.
6,139,494 A 10/2000 Cairnes
6,156,461 A 12/2000 Grenon et al.
6,165,143 A 12/2000 van Lummel
D439,981 S 4/2001 Kasabach et al.
6,228,038 B1 5/2001 Claessens
6,280,409 B1 8/2001 Stone et al.
6,307,955 B1 10/2001 Zank et al.
D451,604 S 12/2001 Kasabach et al.
6,351,666 B1 2/2002 Cuzick et al.
6,356,940 B1 3/2002 Short
6,364,834 B1 4/2002 Reuss et al.
6,368,886 B1 4/2002 Van Broekhoven et al.
6,368,899 B1 4/2002 Featherby et al.
6,379,988 B1 4/2002 Peterson et al.
6,387,206 B1 5/2002 Ghaemmaghami et al.
D460,971 S 7/2002 Sica et al.
6,416,471 B1 7/2002 Kumar et al.
6,443,890 B1 9/2002 Schulze et al.
6,486,801 B1 11/2002 Jones
6,514,218 B2 2/2003 Yamamoto
6,524,239 B1 2/2003 Reed et al.
6,527,711 B1 3/2003 Stivoric et al.
6,595,929 B2 7/2003 Stivoric et al.
6,605,038 B1 8/2003 Teller et al.
6,665,174 B1 12/2003 Derr et al.
6,714,859 B2 3/2004 Jones
6,836,744 B1 12/2004 Asphahani et al.
6,904,359 B2 6/2005 Jones
6,952,645 B1 10/2005 Jones
6,963,772 B2 11/2005 Bloom et al.
6,984,886 B2 1/2006 Ahn et al.
7,011,629 B2 3/2006 Bulat
7,020,508 B2 3/2006 Stivoric et al.
7,030,781 B2 4/2006 Jones
7,054,470 B2 5/2006 Bolle et al.
7,117,031 B2 10/2006 Lohman et al.
7,125,729 B2 10/2006 Burger et al.
7,153,262 B2 12/2006 Stivoric et al.
7,171,680 B2 1/2007 Lange
7,187,961 B2 3/2007 Yamashita et al.
7,196,972 B2 3/2007 Pitocco et al.
7,260,732 B1 8/2007 Bittner, Jr.
7,261,690 B2 8/2007 Teller et al.
7,269,854 B2 9/2007 Simmons et al.
7,285,090 B2 10/2007 Stivoric et al.
7,299,090 B2 11/2007 Koch
7,299,159 B2 11/2007 Nanikashvili
7,313,434 B2 12/2007 Belalcazar et al.
7,313,440 B2 12/2007 Miesel
7,326,305 B2 2/2008 Wurzbacher et al.
7,336,187 B2 2/2008 Hubbard et al.
7,343,260 B1 3/2008 Kahn et al.
7,394,346 B2 7/2008 Bodin
7,400,970 B2 7/2008 Jones
7,435,222 B2 10/2008 Gopinathan et al.
7,457,719 B1 11/2008 Kahn et al.
7,482,935 B2 1/2009 Lee
7,489,299 B2 2/2009 Liberty et al.
7,502,643 B2 3/2009 Farringdon et al.
7,515,961 B2 4/2009 Germanson et al.
7,536,220 B2 5/2009 Horne et al.
7,539,533 B2 5/2009 Tran
7,558,157 B1 7/2009 Gardner et al.
7,565,132 B2 7/2009 Ben Ayed
7,602,301 B1 10/2009 Stirling et al.
7,605,714 B2 10/2009 Thompson et al.
7,609,840 B2 10/2009 Boss et al.
7,609,863 B2 10/2009 Black
7,623,406 B2 11/2009 Park et al.
7,647,195 B1 1/2010 Kahn et al.
7,647,196 B2 1/2010 Kahn et al.
7,653,508 B1 1/2010 Kahn et al.
7,655,508 B2 2/2010 Johnson et al.
7,662,065 B1 2/2010 Kahn et al.
7,666,321 B2 2/2010 Shih
7,689,437 B1 3/2010 Teller et al.
7,690,556 B1 4/2010 Kahn et al.
7,705,723 B2 4/2010 Kahn et al.
7,717,866 B2 5/2010 Damen
7,721,948 B1 5/2010 Silverbrook et al.
7,723,162 B2 5/2010 Anderson et al.
7,725,717 B2 5/2010 Roux
7,733,224 B2 6/2010 Tran
7,747,735 B1 6/2010 Kahn et al.
7,753,861 B1 7/2010 Kahn et al.
7,766,794 B2 8/2010 Oliver et al.
7,769,187 B1 8/2010 Farrar et al.
7,775,993 B2 8/2010 Heruth et al.
7,788,059 B1 8/2010 Kahn et al.
7,800,044 B1 9/2010 Kahn et al.
7,839,279 B2 11/2010 Kahn et al.
7,841,967 B1 11/2010 Kahn et al.
7,849,184 B1 12/2010 Kahn et al.
D631,552 S 1/2011 Kasabach et al.
D632,396 S 2/2011 Kasabach et al.
7,881,902 B1 2/2011 Kahn et al.
7,907,901 B1 3/2011 Kahn et al.
7,909,737 B2 3/2011 Ellis et al.
7,914,468 B2 3/2011 Shalon et al.
7,917,768 B2 3/2011 Kahn et al.
7,959,567 B2 6/2011 Stivoric et al.
7,961,917 B2 6/2011 Black
7,967,731 B2 6/2011 Kil
7,970,586 B1 6/2011 Kahn et al.
7,972,245 B2 7/2011 Temple et al.
7,978,081 B2 7/2011 Shears et al.
7,982,770 B1 7/2011 Kahn et al.
7,987,070 B2 7/2011 Kahn et al.
7,993,276 B2 8/2011 Nazarian et al.
D645,968 S 9/2011 Kasabach et al.
8,011,229 B2 9/2011 Lieberman et al.
8,040,382 B2 10/2011 Kahn et al.
8,047,966 B2 11/2011 Dorogusker et al.
8,049,614 B2 11/2011 Kahn et al.

(56) References Cited

U.S. PATENT DOCUMENTS

| | | | | |
|---|---|---|---|---|
| 8,064,759 | B1 | 11/2011 | Kahn et al. | |
| 8,073,707 | B2 | 12/2011 | Teller et al. | |
| 8,083,643 | B2 | 12/2011 | Ng et al. | |
| 8,139,822 | B2 | 3/2012 | Seiner | |
| 8,160,683 | B2 | 4/2012 | Shah et al. | |
| 8,182,424 | B2 | 5/2012 | Heckerman | |
| 8,190,253 | B2 | 5/2012 | Heruth et al. | |
| 8,204,786 | B2 | 6/2012 | LeBoeuf et al. | |
| 8,209,147 | B2 | 6/2012 | Solinsky | |
| 8,231,555 | B2 | 7/2012 | Skelton et al. | |
| 8,231,556 | B2 | 7/2012 | Skelton et al. | |
| 8,239,049 | B2 | 8/2012 | Koya et al. | |
| 8,241,184 | B2 | 8/2012 | DiBenedetto et al. | |
| 8,251,875 | B2 | 8/2012 | Ellis et al. | |
| 8,313,416 | B2 | 11/2012 | Ellis et al. | |
| 8,315,693 | B2 | 11/2012 | Lu et al. | |
| 8,332,544 | B1 | 12/2012 | Ralls et al. | |
| 8,423,643 | B2 | 4/2013 | Bouknight et al. | |
| 8,451,710 | B2 | 5/2013 | Lee et al. | |
| 8,461,988 | B2 | 6/2013 | Tran | |
| 8,512,209 | B2 | 8/2013 | Guidi et al. | |
| 8,527,016 | B2 | 9/2013 | Lee et al. | |
| 8,579,766 | B2 | 11/2013 | Al-Tawil | |
| 8,672,852 | B2 | 3/2014 | Gavish | |
| 8,727,947 | B2 | 5/2014 | Tagliabue | |
| 8,793,522 | B2 | 7/2014 | Hosain et al. | |
| 2001/0004234 | A1 | 6/2001 | Petelenz et al. | |
| 2001/0031930 | A1 | 10/2001 | Roizen et al. | |
| 2001/0042850 | A1 | 11/2001 | Cote et al. | |
| 2001/0056226 | A1 | 12/2001 | Zodnik et al. | |
| 2002/0019584 | A1 | 2/2002 | Schulze et al. | |
| 2002/0074877 | A1 | 6/2002 | Lee et al. | |
| 2002/0082809 | A1 | 6/2002 | Kanevsky et al. | |
| 2002/0143491 | A1 | 10/2002 | Scherzinger | |
| 2003/0046228 | A1 | 3/2003 | Berney | |
| 2003/0065626 | A1 | 4/2003 | Allen | |
| 2003/0125017 | A1 | 7/2003 | Greene et al. | |
| 2003/0130595 | A1 | 7/2003 | Mault | |
| 2003/0139654 | A1 | 7/2003 | Kim et al. | |
| 2003/0139692 | A1 | 7/2003 | Barrey et al. | |
| 2003/0153955 | A1 | 8/2003 | Park et al. | |
| 2003/0171791 | A1 | 9/2003 | KenKnight et al. | |
| 2003/0195398 | A1 | 10/2003 | Suzuki et al. | |
| 2003/0229514 | A2 | 12/2003 | Brown | |
| 2003/0236474 | A1 | 12/2003 | Singh | |
| 2004/0015103 | A1 | 1/2004 | Aminian et al. | |
| 2004/0064324 | A1 | 4/2004 | Graumann | |
| 2004/0102814 | A1 | 5/2004 | Sorensen et al. | |
| 2004/0116784 | A1 | 6/2004 | Gavish | |
| 2004/0133081 | A1 | 7/2004 | Teller et al. | |
| 2004/0147818 | A1 | 7/2004 | Levy et al. | |
| 2004/0152957 | A1 | 8/2004 | Stivoric et al. | |
| 2004/0181166 | A1 | 9/2004 | Williford et al. | |
| 2005/0113650 | A1 | 5/2005 | Pacione et al. | |
| 2005/0113703 | A1 | 5/2005 | Farringdon et al. | |
| 2005/0113710 | A1 | 5/2005 | Stahmann et al. | |
| 2005/0131803 | A1 | 6/2005 | Lapstun et al. | |
| 2005/0140005 | A1 | 6/2005 | Huang et al. | |
| 2005/0180618 | A1 | 8/2005 | Black | |
| 2005/0201585 | A1 | 9/2005 | Jannard et al. | |
| 2005/0216064 | A1 | 9/2005 | Heruth et al. | |
| 2005/0222643 | A1 | 10/2005 | Heruth et al. | |
| 2005/0234514 | A1 | 10/2005 | Heruth et al. | |
| 2005/0234518 | A1 | 10/2005 | Heruth et al. | |
| 2005/0240086 | A1 | 10/2005 | Akay | |
| 2005/0242946 | A1 | 11/2005 | Hubbard et al. | |
| 2005/0245790 | A1 | 11/2005 | Bergfalk et al. | |
| 2005/0245988 | A1 | 11/2005 | Miesel | |
| 2006/0064030 | A1 | 3/2006 | Cosentino et al. | |
| 2006/0079740 | A1 | 4/2006 | Silver et al. | |
| 2006/0089538 | A1 | 4/2006 | Cuddihy et al. | |
| 2006/0122474 | A1 | 6/2006 | Teller et al. | |
| 2006/0136744 | A1 | 6/2006 | Lange | |
| 2006/0193273 | A1 | 8/2006 | Passier et al. | |
| 2006/0200009 | A1 | 9/2006 | Wekell et al. | |
| 2006/0224051 | A1 | 10/2006 | Teller et al. | |
| 2006/0237252 | A1 | 10/2006 | Mobley et al. | |
| 2006/0264730 | A1 | 11/2006 | Stivoric et al. | |
| 2006/0281975 | A1 | 12/2006 | Yang | |
| 2006/0282021 | A1 | 12/2006 | DeVaul et al. | |
| 2007/0027367 | A1 | 2/2007 | Oliver et al. | |
| 2007/0027369 | A1 | 2/2007 | Pagnacco et al. | |
| 2007/0027370 | A1 | 2/2007 | Brauker et al. | |
| 2007/0050715 | A1 | 3/2007 | Behar | |
| 2007/0055888 | A1 | 3/2007 | Miller et al. | |
| 2007/0113207 | A1 | 5/2007 | Gritton | |
| 2007/0161874 | A1 | 7/2007 | Aerts | |
| 2007/0167689 | A1 | 7/2007 | Ramadas et al. | |
| 2007/0173705 | A1 | 7/2007 | Teller et al. | |
| 2007/0186429 | A1 | 8/2007 | Bonnet et al. | |
| 2007/0197878 | A1 | 8/2007 | Shklarski | |
| 2007/0208233 | A1 | 9/2007 | Kovacs | |
| 2007/0219059 | A1 | 9/2007 | Schwartz et al. | |
| 2007/0236330 | A1 | 10/2007 | Cho et al. | |
| 2007/0239061 | A1 | 10/2007 | Carter et al. | |
| 2007/0253602 | A1 | 11/2007 | Amano | |
| 2007/0258507 | A1 | 11/2007 | Lee et al. | |
| 2007/0259629 | A1 | 11/2007 | Lee et al. | |
| 2007/0259662 | A1 | 11/2007 | Lee et al. | |
| 2007/0276282 | A1 | 11/2007 | Fukumura et al. | |
| 2007/0293737 | A1 | 12/2007 | Heruth et al. | |
| 2007/0293741 | A1 | 12/2007 | Bardy | |
| 2007/0294360 | A1 | 12/2007 | Ebling et al. | |
| 2008/0001735 | A1 | 1/2008 | Tran et al. | |
| 2008/0004904 | A1 | 1/2008 | Tran | |
| 2008/0015422 | A1 | 1/2008 | Wessel | |
| 2008/0027337 | A1 | 1/2008 | Dugan et al. | |
| 2008/0040615 | A1 | 2/2008 | Carper et al. | |
| 2008/0055074 | A1 | 3/2008 | Gao et al. | |
| 2008/0058670 | A1 | 3/2008 | Mainini | |
| 2008/0072153 | A1 | 3/2008 | Yang | |
| 2008/0086318 | A1 * | 4/2008 | Gilley et al. | 705/1 |
| 2008/0096726 | A1 | 4/2008 | Riley et al. | |
| 2008/0104415 | A1 | 5/2008 | Palti-Wasserman et al. | |
| 2008/0125288 | A1 | 5/2008 | Case | |
| 2008/0133227 | A1 | 6/2008 | Kong et al. | |
| 2008/0139899 | A1 | 6/2008 | Student et al. | |
| 2008/0158155 | A1 | 7/2008 | Liberty et al. | |
| 2008/0165017 | A1 | 7/2008 | Schwartz | |
| 2008/0167535 | A1 | 7/2008 | Stivoric et al. | |
| 2008/0176655 | A1 | 7/2008 | James et al. | |
| 2008/0183388 | A1 | 7/2008 | Goodrich | |
| 2008/0201658 | A1 | 8/2008 | Saito et al. | |
| 2008/0208015 | A1 | 8/2008 | Morris et al. | |
| 2008/0214903 | A1 | 9/2008 | Orbach | |
| 2008/0214949 | A1 | 9/2008 | Stivoric et al. | |
| 2008/0216171 | A1 | 9/2008 | Sano et al. | |
| 2008/0221396 | A1 | 9/2008 | Garces et al. | |
| 2008/0229400 | A1 | 9/2008 | Burke | |
| 2008/0230598 | A1 | 9/2008 | Bodin | |
| 2008/0262376 | A1 | 10/2008 | Price | |
| 2008/0287751 | A1 | 11/2008 | Stivoric et al. | |
| 2008/0287821 | A1 | 11/2008 | Jung et al. | |
| 2008/0300470 | A1 | 12/2008 | Gerber et al. | |
| 2009/0006458 | A1 | 1/2009 | Stivoric et al. | |
| 2009/0016245 | A1 | 1/2009 | Karls | |
| 2009/0019374 | A1 | 1/2009 | Logan et al. | |
| 2009/0048540 | A1 | 2/2009 | Otto et al. | |
| 2009/0069724 | A1 | 3/2009 | Otto et al. | |
| 2009/0072955 | A1 | 3/2009 | Cary | |
| 2009/0082677 | A1 | 3/2009 | Shih et al. | |
| 2009/0112626 | A1 | 4/2009 | Talbot et al. | |
| 2009/0131759 | A1 | 5/2009 | Sims et al. | |
| 2009/0137366 | A1 | 5/2009 | Hirata et al. | |
| 2009/0146947 | A1 | 6/2009 | Ng | |
| 2009/0149723 | A1 | 6/2009 | Krauss et al. | |
| 2009/0163774 | A1 | 6/2009 | Thatha et al. | |
| 2009/0171233 | A1 | 7/2009 | Lanfermann et al. | |
| 2009/0186668 | A1 | 7/2009 | Rahman et al. | |
| 2009/0192362 | A1 | 7/2009 | Sweeney | |
| 2009/0208756 | A1 | 8/2009 | Kimura et al. | |
| 2009/0218725 | A1 | 9/2009 | Thelemann et al. | |
| 2009/0221234 | A1 | 9/2009 | Pirzada et al. | |
| 2009/0240115 | A1 | 9/2009 | Bluth | |

(56) References Cited

U.S. PATENT DOCUMENTS

| | | | |
|---|---|---|---|
| 2009/0262069 | A1 | 10/2009 | Huntington |
| 2009/0270743 | A1 | 10/2009 | Dugan et al. |
| 2009/0275442 | A1 | 11/2009 | Nissila |
| 2009/0287109 | A1 | 11/2009 | Ferren et al. |
| 2009/0287120 | A1 | 11/2009 | Ferren et al. |
| 2009/0292180 | A1 | 11/2009 | Mirow |
| 2009/0292222 | A1 | 11/2009 | Ferren et al. |
| 2009/0299212 | A1 | 12/2009 | Principe et al. |
| 2009/0318779 | A1 | 12/2009 | Tran |
| 2009/0319221 | A1 | 12/2009 | Kahn et al. |
| 2009/0319347 | A1 | 12/2009 | Albrecht |
| 2010/0004947 | A1 | 1/2010 | Nadeau et al. |
| 2010/0030578 | A1 | 2/2010 | Siddique et al. |
| 2010/0033303 | A1 | 2/2010 | Dugan et al. |
| 2010/0041772 | A1 | 2/2010 | Liversage et al. |
| 2010/0052897 | A1 | 3/2010 | Allen et al. |
| 2010/0070867 | A1 | 3/2010 | Lemmers |
| 2010/0076333 | A9 | 3/2010 | Burton et al. |
| 2010/0100004 | A1 | 4/2010 | van Someren |
| 2010/0100997 | A1 | 4/2010 | Lee et al. |
| 2010/0119461 | A1 | 5/2010 | Bicard-Benhamou et al. |
| 2010/0158288 | A1 | 6/2010 | Winter |
| 2010/0178834 | A1 | 7/2010 | Toyoda et al. |
| 2010/0217099 | A1 | 8/2010 | LeBoeuf et al. |
| 2010/0222179 | A1 | 9/2010 | Temple et al. |
| 2010/0234699 | A1 | 9/2010 | Lanfermann et al. |
| 2010/0240962 | A1 | 9/2010 | Contant et al. |
| 2010/0249625 | A1 | 9/2010 | Lin |
| 2010/0253470 | A1 | 10/2010 | Burke |
| 2010/0256460 | A1 | 10/2010 | Haveri et al. |
| 2010/0268056 | A1 | 10/2010 | Picard et al. |
| 2010/0274100 | A1 | 10/2010 | Behar et al. |
| 2010/0279086 | A1 | 11/2010 | Park et al. |
| 2010/0279554 | A1 | 11/2010 | Steijner |
| 2010/0298660 | A1 | 11/2010 | McCombie et al. |
| 2010/0305642 | A1 | 12/2010 | Dong et al. |
| 2010/0312833 | A1 | 12/2010 | Rimmer et al. |
| 2010/0315225 | A1 | 12/2010 | Teague |
| 2010/0317488 | A1 | 12/2010 | Cartaya |
| 2010/0331146 | A1 | 12/2010 | Kil |
| 2010/0331682 | A1 | 12/2010 | Stein et al. |
| 2011/0004072 | A1 | 1/2011 | Fletcher et al. |
| 2011/0021930 | A1 | 1/2011 | Mazzeo et al. |
| 2011/0040574 | A1 | 2/2011 | Fung et al. |
| 2011/0042813 | A1 | 2/2011 | Crain et al. |
| 2011/0046519 | A1 | 2/2011 | Raheman |
| 2011/0054782 | A1 | 3/2011 | Kaahui |
| 2011/0060215 | A1 | 3/2011 | Tupin et al. |
| 2011/0060635 | A1 | 3/2011 | Pollard et al. |
| 2011/0061150 | A1 | 3/2011 | Surve |
| 2011/0066064 | A1 | 3/2011 | Jangle et al. |
| 2011/0071003 | A1 | 3/2011 | Watterson et al. |
| 2011/0071364 | A1 | 3/2011 | Kuo et al. |
| 2011/0087115 | A1 | 4/2011 | Sackner et al. |
| 2011/0092779 | A1 | 4/2011 | Chang et al. |
| 2011/0098156 | A1 | 4/2011 | Ng et al. |
| 2011/0106627 | A1 | 5/2011 | LeBoeuf et al. |
| 2011/0125063 | A1 | 5/2011 | Shalon et al. |
| 2011/0152695 | A1 | 6/2011 | Granqvist et al. |
| 2011/0160544 | A1 | 6/2011 | Hayter |
| 2011/0169603 | A1 | 7/2011 | Fithian et al. |
| 2011/0208444 | A1 | 8/2011 | Solinsky |
| 2011/0213225 | A1 | 9/2011 | Bernstein et al. |
| 2011/0230732 | A1 | 9/2011 | Edman et al. |
| 2011/0245633 | A1* | 10/2011 | Goldberg et al. ............. 600/301 |
| 2011/0245711 | A1 | 10/2011 | Katra et al. |
| 2011/0288605 | A1 | 11/2011 | Kaib et al. |
| 2012/0004517 | A1 | 1/2012 | Starr et al. |
| 2012/0004525 | A1 | 1/2012 | Brown |
| 2012/0030043 | A1 | 2/2012 | Ross |
| 2012/0032797 | A1 | 2/2012 | Babineau |
| 2012/0059235 | A1 | 3/2012 | Davies |
| 2012/0071732 | A1 | 3/2012 | Grey et al. |
| 2012/0143019 | A1 | 6/2012 | Russell |
| 2012/0179480 | A1 | 7/2012 | Patel et al. |
| 2012/0184871 | A1 | 7/2012 | Jang et al. |
| 2012/0197162 | A1 | 8/2012 | Goto |
| 2012/0203076 | A1 | 8/2012 | Fatta et al. |
| 2012/0203081 | A1 | 8/2012 | LeBoeuf et al. |
| 2012/0209413 | A1 | 8/2012 | Xu et al. |
| 2012/0224725 | A1 | 9/2012 | Prevot et al. |
| 2012/0245439 | A1 | 9/2012 | Andre et al. |
| 2012/0302911 | A1 | 11/2012 | Cheung et al. |
| 2012/0313272 | A1 | 12/2012 | Fullam et al. |
| 2012/0313296 | A1 | 12/2012 | Drysdale et al. |
| 2012/0313746 | A1 | 12/2012 | Rahman et al. |
| 2012/0315382 | A1 | 12/2012 | Drysdale et al. |
| 2012/0316455 | A1 | 12/2012 | Rahman et al. |
| 2012/0316456 | A1 | 12/2012 | Rahman et al. |
| 2012/0316458 | A1 | 12/2012 | Hosain et al. |
| 2012/0316896 | A1 | 12/2012 | Rahman et al. |
| 2012/0316932 | A1 | 12/2012 | Rahman et al. |
| 2012/0317024 | A1 | 12/2012 | Rahman et al. |
| 2012/0317430 | A1 | 12/2012 | Hosain et al. |
| 2013/0028301 | A1 | 1/2013 | Sashittal et al. |
| 2013/0094659 | A1* | 4/2013 | Liu ................................ 381/74 |
| 2013/0110011 | A1 | 5/2013 | McGregor et al. |
| 2013/0148024 | A1 | 6/2013 | Shin et al. |
| 2013/0173171 | A1 | 7/2013 | Drysdale et al. |
| 2013/0176142 | A1 | 7/2013 | Drysdale et al. |
| 2013/0179116 | A1 | 7/2013 | Rahman et ai. |
| 2013/0194066 | A1 | 8/2013 | Hosain et al. |
| 2013/0198694 | A1 | 8/2013 | Rahman et al. |
| 2014/0155714 | A1 | 6/2014 | Gavish |

FOREIGN PATENT DOCUMENTS

| | | | |
|---|---|---|---|
| WO | PCT/US01/20014 | | 1/2002 |
| WO | PCT/US02/24552 | | 2/2003 |
| WO | PCT/US03/26261 | | 3/2004 |
| WO | PCT/US04/26187 | | 2/2005 |
| WO | PCT/US05/09476 | | 10/2005 |
| WO | PCT/US08/54312 | | 8/2008 |
| WO | 2010064162 | | 6/2010 |
| WO | PCT/US09/06234 | | 6/2010 |
| WO | WO2011046657 | A2 | 4/2011 |
| WO | WO2012170283 | A1 | 4/2011 |
| WO | 2012170107 | A1 | 12/2012 |
| WO | 2012170108 | A1 | 12/2012 |
| WO | 2012170109 | | 12/2012 |
| WO | 2012170162 | A1 | 12/2012 |
| WO | 2012170177 | A1 | 12/2012 |
| WO | 2012170922 | A1 | 12/2012 |
| WO | 2012170924 | A1 | 12/2012 |
| WO | 2012171025 | A1 | 12/2012 |
| WO | 2012171032 | | 12/2012 |
| WO | 2012171033 | | 12/2012 |
| WO | 2012171037 | A1 | 12/2012 |
| WO | WO2012170110 | A1 | 12/2012 |
| WO | WO2012170225 | | 12/2012 |
| WO | WO2012170260 | | 12/2012 |
| WO | WO2012170305 | A1 | 12/2012 |
| WO | 2013016451 | A1 | 1/2013 |

OTHER PUBLICATIONS

U.S. Appl. No. 12/472,361, filed Dec. 2, 2010, Kahn et al.
U.S. Appl. No. 12/247,950, filed Apr. 8, 2010, Kahn et al.
U.S. Appl. No. 12/202,206, filed Mar. 4, 2010, Kahn et al.
U.S. Appl. No. 12/469,633, filed Nov. 26, 2009, Kahn et al.
U.S. Appl. No. 12/113,110, filed Nov. 5, 2009, Kahn et al.
U.S. Appl. No. 11/871,151, filed Apr. 16, 2009, Kahn et al.
U.S. Appl. No. 12/490,304, filed Dec. 24, 2009, Kahn et al.
U.S. Appl. No. 11/582,896, filed May 3, 2007, Stivoric et al.
U.S. Appl. No. 10/638,588, filed Feb. 19, 2004, Teller et al.
U.S. Appl. No. 10/682,293, filed Jul. 8, 2004, Teller et al.
U.S. Appl. No. 10/940,214, filed May 26, 2005, Pacione et al.
U.S. Appl. No. 11/088,002, filed Nov. 3, 2005, Stivoric et al.
U.S. Appl. No. 11/239,748, filed Nov. 23, 2006, Stivoric et al.
U.S. Appl. No. 11/322,010, filed Jun. 8, 2006, Teller et al.
U.S. Appl. No. 11/434,949, filed Oct. 5, 2006, Teller et al.
U.S. Appl. No. 11/481,147, filed Feb. 15, 2007, Stivoric et al.

(56) References Cited

OTHER PUBLICATIONS

U.S. Appl. No. 11/724,373, filed Jul. 26, 2007, Teller et al.
U.S. Appl. No. 11/925,906, filed Jul. 31, 2008, Teller et al.
U.S. Appl. No. 11/925,965, filed Jul. 17, 2008, Stivoric et al.
U.S. Appl. No. 11/928,039, filed Jul. 10, 2008, Stivoric et al.
U.S. Appl. No. 11/928,302, filed Jul. 31, 2008, Farringdon et al.
U.S. Appl. No. 11/930,036, filed Jul. 10, 2008, Teller et al.
U.S. Appl. No. 11/930,053, filed Jul. 10, 2008, Teller et al.
U.S. Appl. No. 11/930,081, filed Jul. 3, 2008, Teller et al.
U.S. Appl. No. 11/930,091, filed Jul. 3, 2008, Teller et al.
U.S. Appl. No. 11/930,092, filed Jul. 17, 2008, Teller et al.
U.S. Appl. No. 11/930,094, filed Jul. 17, 2008, Teller et al.
U.S. Appl. No. 12/033,728, filed Jan. 1, 2009, Stivoric et al.
U.S. Appl. No. 12/033,722, filed Jan. 1, 2009, Stivoric et al.
U.S. Appl. No. 12/033,731, filed Dec. 25, 2008, Stivoric et al.
U.S. Appl. No. 12/033,737, filed Dec. 25, 2008, Stivoric et al.
U.S. Appl. No. 12/033,741, filed Dec. 25, 2008, Stivoric et al.
U.S. Appl. No. 12/033,746, filed Dec. 25, 2008, Stivoric et al.
U.S. Appl. No. 12/033,751, filed Dec. 25, 2008, Stivoric et al.
U.S. Appl. No. 12/033,753, filed Dec. 25, 2008, Stivoric et al.
U.S. Appl. No. 12/033,760, filed Dec. 25, 2008, Stivoric et al.
U.S. Appl. No. 12/033,766, filed Dec. 25, 2008, Stivoric et al.
U.S. Appl. No. 12/217,299, filed Jul. 9, 2009, Stivoric et al.
U.S. Appl. No. 12/840,109, filed Nov. 11, 2010, Farringdon et al.
U.S. Appl. No. 11/925,902, filed May 7, 2009, Teller et al.
U.S. Appl. No. 11/925,903, filed Jul. 31, 2008, Teller et al.
U.S. Appl. No. 11/925,908, filed Jul. 17, 2008, Teller et al.
U.S. Appl. No. 11/930,405, filed Jul. 24, 2008, Teller et al.
U.S. Appl. No. 11/928,059, filed Sep. 4, 2008, Stivoric et al.
U.S. Appl. No. 11/928,027, filed Jul. 3, 2008, Stivoric et al.
U.S. Appl. No. 11/928,051, filed Jul. 10, 2008, Stivoric et al.
U.S. Appl. No. 11/930,100, filed Jul. 17, 2008, Teller et al.
U.S. Appl. No. 11/930,048, filed Jul. 10, 2008, Teller et al.
U.S. Appl. No. 11/930,101, filed Jul. 10, 2008, Teller et al.
U.S. Appl. No. 11/927,365, filed Nov. 20, 2008, Stivoric et al.
U.S. Appl. No. 11/927,276, filed Nov. 20, 2008, Stivoric et al.
U.S. Appl. No. 13/182,352, filed Jan. 5, 2012, Nazarian et al.
U.S. Appl. No. 12/560,069, filed Aug. 26, 2010, Nadkarni et al.
U.S. Appl. No. 12/621,099, filed Sep. 30, 2010, Nadkarni et al.
U.S. Appl. No. 12/823,280, filed Jan. 6, 2011, Bentley et al.
U.S. Appl. No. 12/883,304, filed Mar. 17, 2011, Jangle et al.
U.S. Appl. No. 12/891,108, filed Mar. 17, 2011, Jangle et al.
U.S. Appl. No. 13/204,658, filed Nov. 24, 2011, Jangle et al.
U.S. Appl. No. 12/730,194, filed Sep. 23, 2010, Ram David Adva Fish.
U.S. Appl. No. 12/730,199, filed Sep. 23, 2010, Ram David Adva Fish.
Abouelela May A., USPTO Final Office Action, U.S. Appl. No. 13/492,770, Date of Mailing Nov. 11, 2014.
Abouelela May A., USPTO Final Office Action, U.S. Appl. No. 13/492,770, Date of Mailing Jun. 11, 2014.
Abouelela May A., USPTO Final Office Action, U.S. Appl. No. 13/492,770, Date of Mailing Jan. 23, 2014.
Abouelela May A., USPTO Non-Final Office Action, U.S. Appl. No. 13/492,770, Date of Mailing Jun. 11, 2013.
Copenheaver, Blaine R., ISA Notification of Transmittal of the international Search Report and the Written Opinion of the International Searching Authority, or the Declaration, Application No. PCT/US12/41958, Date of Mailing Sep. 14, 2012.
Copenheaver, Blaine R., ISA Notification of Transmittal of the International Search Report and the Written Opinion of the International Searching Authority, or the Declaration, Application No. PCT/USI2/41959, Date of Mailing Sep. 13, 2012.
Soriano, Bobby, USPTO Non-Final Office Action, U.S. Appl. No. 13/181,495, Date of Mailing Aug. 26, 2014.
Soriano, Bobby, USPTO Non-Final Office Action, U.S. Appl. No. 13/181,495, Date of Mailing Mar. 28, 2012.
Young, Lee W., ISA Notification of Transmittal of the International Search Report and the Written Opinion of the International Searching Authority, or the Declaration, Application No. PCT/US12/31325, Date of Mailing Jul. 24, 2012.
Porter, Rachel L., USPTO Non-Final Office Action, U.S. Appl. No. 13/181,511, Date of Mailing Jul. 3, 2014.
Porter, Rachel L., Uspto Non-Final Office Action, U.S. Appl. No. 13/181,511, Date of Mailing Sep. 9, 2013.
Young, Lee W., ISA Notification of Transmittal of the International Search Report and the Written Opinion of the International Searching Authority, or the Declaration, Application No. PCT/US12/39763, Aug. 7, 2012.
Ma, Kam, USPTO Final Office Action, U.S. Appl. No. 13/181,486, Date of Mailing Jan. 15, 2014.
Ma, Kam, USPTO Non-Final Office Action, U.S. Appl. No. 13/181,486, Date of Mailing Jan. 15, 2014.
Young Lee W., ISA Notification of Transmittal of the International Search Report and the Written Opinion of the International Searching Authority, or the Declaration, Application No. PCT/US12/40047, Date of Mailing Aug. 16, 2012.
Kim, Steven, USPTO Final Office Action, U.S. Appl. No. 13/181,500, Date of Mailing Aug. 7, 2013.
Kim, Steven, USPTO Non-Final Office Action, U.S. Appl. No. 13/181,500, Date of Mailing Feb. 12, 2013.
White, Ron, "How Computers Work", Oct. 2003, Que, 7th Edition.
Young Lee W., ISA Notification of Transmittal of the International Search Report and the Written Opinion of the International Searching Authority, or the Declaration, Application No. PCT/US12/40328, Date of Mailing Aug. 17, 2012.
Abouelela, May A. USPTO Non-Final Office Action, U.S. Appl. No. 13/181,498, Date of Mailing Sep. 15, 2014.
Abouelela, May A. USPTO Final Office Action, U.S. Appl. No. 13/181,498, Date of Mailing Apr. 23, 2014.
Abouelela, May A. USPTO Non-Final Office Action, U.S. Appl. No. 13/181,498, Date of Mailing Dec. 26, 2012.
Young, Lee W., ISA Notification of Transmittal of the International Search Report and the Written Opinion of the International Searching Authority, or the Declaration, Application No. PCT/US12/31326, Date of Mailing Aug. 3, 2012.
Abouelela, May A. USPTO Non-Final Office Action, U.S. Appl. No. 13/181,513, Date of Mailing Sep. 17, 2014.
Abouelela, May A. USPTO Final Office Action, U.S. Appl. No. 13/181,513, Date of Mailing Apr. 29, 2014.
Abouelela, May A. USPTO Non-Final Office Action, U.S. Appl. No. 13/181,513, Date of Mailing Dec. 26, 2013.
Young, Lee W., ISA Notification of Transmittal of the International Search Report and the Written Opinion of the International Searching Authority, or the Declaration, Application No. PCT/US12/40590, Date of Mailing Sep. 7, 2012.
Young, Lee W., ISA Notification of Transmittal of the International Search Report and the Written Opinion of the International Searching Authority, or the Declaration, Application No. PCT/US12/41716, Date of Mailing Jan. 4, 2013.
Young, Lee W., ISA Notification of Transmittal of the International Search Report and the Written Opinion of the International Searching Authority, or the Declaration, Application No. PCT/US12/31319, Date of Mailing Jul. 7, 2012.
Copenheaver, Blaine R., ISA Notification of Transmittal of the International Search Report and the Written Opinion of the International Searching Authority, or the Declaration, Application No. PCT/US12/48188, Date of Mailing Oct. 19, 2012.
Young, Lee W., ISA Notification of Transmittal of the International Search Report and the Written Opinion of the International Searching Authority, or the Declaration, Application No, PCT/US12/38185, Date of Mailing Aug. 17, 2012.
Young, Lee W., ISA Notification of Transmittal of the International Search Report and the Written Opinion of the International Searching Authority, or the Declaration, Application No, PCT/US12/38201, Date of Mailing Jul. 7, 2012.
Copenheaver, Blaine R., ISA Notification of Transmittal of the International Search Report and the Written Opinion of the International Searching Authority, or the Declaration, Application No. PCT/US12/38410, Date of Mailing Sep. 7, 2012.

(56) References Cited

OTHER PUBLICATIONS

Copenheaver, Blaine R., ISA Notification of Transmittal of the International Search Report and the Written Opinion of the International Searching Authority, or the Declaration, Application No. PCT/US12/41940, Date of Mailing Sep. 13, 2012.
Thomas, Shane, ISA Notification of Transmittal of the International Search Report and the Written Opinion of the International Searching Authority, or the Declaration, Application No. PCT/US12/41710, Date of Mailing Aug. 24, 2012.
Young, Lee W., ISA Notification of Transmittal of the International Search Report and the Written Opinion of the International Searching Authority, or the Declaration, Application No. PCT/US12/41964, Date of Mailing Aug. 28, 2012.
Young Lee W., ISA Notification of Transmittal of the International Search Report and the Written Opinion of the International Searching Authority, or the Declaration, Application No. PCT/US12/31322, Date of Mailing Jul. 13, 2012.
Lee, Edmund H., USPTO Final Office Action, U.S. Appl. No. 13/158,372, Date of Mailing May 29, 2014.
Lee, Edmund H., USPTO Non-Final Office Action, U.S. Appl. No. 13/158,372, Date of Mailing Oct. 25, 2013.
Murata, Austin, USPTO Non-Final Office Action, U.S. Appl. No. 13/135,728, Date of Mailing Oct. 22, 2014.
Murata, Austin, USPTO Final Office Action, U.S. Appl. No. 13/135,728, Date of Mailing Feb. 4, 2014.
Murata, Austin, USPTO Non-Final Office Action, U.S. Appl. No. 13/135,728, Date of Mailing Oct. 9, 2013.
Lee, Edmund H., USPTO Final Office Action, U.S. Appl. No. 13/158,416, Date of Mailing Apr. 30, 2014.
Lee, Edmund H., USPTO Non-Final Office Action, U.S. Appl. No. 13/158,416, Date of Mailing Oct. 10, 2014.
Suryawanshi, Suresh, USPTO Non-Final Office Action, U.S. Appl. No. 13/180,320, Date of Mailing Sep. 17, 2013.
Auve, Glenn Allen, USPTO Non-Final Office Action, U.S. Appl. No. 13/247,975, Date of Mailing Jun. 9, 2014.
Abouelela, May A., USPTO Final Office Action, U.S. Appl. No. 13/180,000, Date of Mailing Nov. 25, 2014.
Abouelela, May A., USPTO Non-Final Office Action, U.S. Appl. No. 13/180,000, Date of Mailing Jun. 10, 2014.
Abouelela, May A., USPTO Final Office Action, U.S. Appl. No. 13/180,000, Date of Mailing Jan. 28, 2014.
Abouelela, May A., USPTO Non-Final Office Action, U.S. Appl. No. 13/180,000, Date of Mailing Sep. 28, 2013.
Abouelela, May A., USPTO Non-Final Office Action, U.S. Appl. No. 13/491,524, Date of Mailing Jun. 10, 2014.
Abouelela, May A., USPTO Final Office Action, U.S. Appl. No. 13/491,524, Date of Mailing Feb. 10, 2014.
Aboueiela, May A., USPTO Non-Final Office Action, U.S. Appl. No. 13/491,524, Date of Mailing Jun. 13, 2013.

* cited by examiner

MEDIA DEVICE, APPLICATION, AND CONTENT MANAGEMENT USING SENSORY INPUT

CROSS-REFERENCE TO RELATED APPLICATIONS

This application is a continuation-in-part U.S. non-provisional patent application of U.S. patent application Ser. No. 13/180,000, filed Jul. 11, 2011, entitled "Data-Capable Band for Medical Diagnosis, Monitoring, and Treatment," U.S. patent application Ser. No. 13/180,320, filed Jul. 11, 2011, entitled "Power Management in a Data-Capable Strapband," U.S. patent application Ser. No. 13/158,372, filed Jun. 10, 2011, and entitled "Component Protective Overmolding," U.S. patent application Ser. No. 13/158,416, filed Jun. 11, 2011, and entitled "Component Protective Overmolding," and claims the benefit of U.S. Provisional Patent Application No. 61/495,995, filed Jun. 11, 2011, and entitled "Data-Capable Strapband," U.S. Provisional Patent Application No. 61,495,994, filed Jun. 11, 2011, and entitled "Data-Capable Strapband," U.S. Provisional Patent Application No. 61/495,997, filed Jun. 11, 2011, and entitled "Data-Capable Strapband," and U.S. Provisional Patent Application No. 61/495,996, filed Jun. 11, 2011, and entitled "Data-Capable Strapband," all of which are herein incorporated by reference for all purposes.

FIELD

The present invention relates generally to electrical and electronic hardware, computer software, human-computing interfaces, wired and wireless network communications, data processing, and computing devices. More specifically, techniques for media device, application, and content management using sensory input are described.

BACKGROUND

With the advent of greater computing capabilities in smaller personal and/or portable form factors and an increasing number of applications (i.e., computer and Internet software or programs) for different uses, consumers (i.e., users) have access to large amounts of personal data. Information and data are often readily available, but poorly captured using conventional data capture devices. Conventional devices typically lack capabilities that can capture, analyze, communicate, or use data in a contextually-meaningful, comprehensive, and efficient manner. Further, conventional solutions are often limited to specific individual purposes or uses, demanding that users invest in multiple devices in order to perform different activities (e.g., a sports watch for tracking time and distance, a GPS receiver for monitoring a hike or run, a cyclometer for gathering cycling data, and others). Although a wide range of data and information is available, conventional devices and applications fail to provide effective solutions that comprehensively capture data for a given user across numerous disparate activities. Further, tools, functions, or features that allow efficient and activity or state-related management of data-capture devices and content are unavailable in conventional solutions.

Some conventional solutions combine a small number of discrete functions. Functionality for data capture, processing, storage, or communication in conventional devices such as a watch or timer with a heart rate monitor or global positioning system ("GPS") receiver are available conventionally, but are expensive to manufacture and purchase. Other conventional solutions for combining personal data capture facilities often present numerous design and manufacturing problems such as size restrictions, specialized materials requirements, lowered tolerances for defects such as pits or holes in coverings for water-resistant or waterproof devices, unreliability, higher failure rates, increased manufacturing time, and expense. Subsequently, conventional devices such as fitness watches, heart rate monitors, GPS-enabled fitness monitors, health monitors (e.g., diabetic blood sugar testing units), digital voice recorders, pedometers, altimeters, and other conventional personal data capture devices are generally manufactured for conditions that occur in a single or small groupings of activities. Further, conventional devices typically do not provide features or functions, based on the types of data captured, to manage other information or data, including media devices, applications, formats, and content of various types.

Thus, what is needed is a solution for managing media without the limitations of conventional techniques.

BRIEF DESCRIPTION OF THE DRAWINGS

Various embodiments or examples ("examples") are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
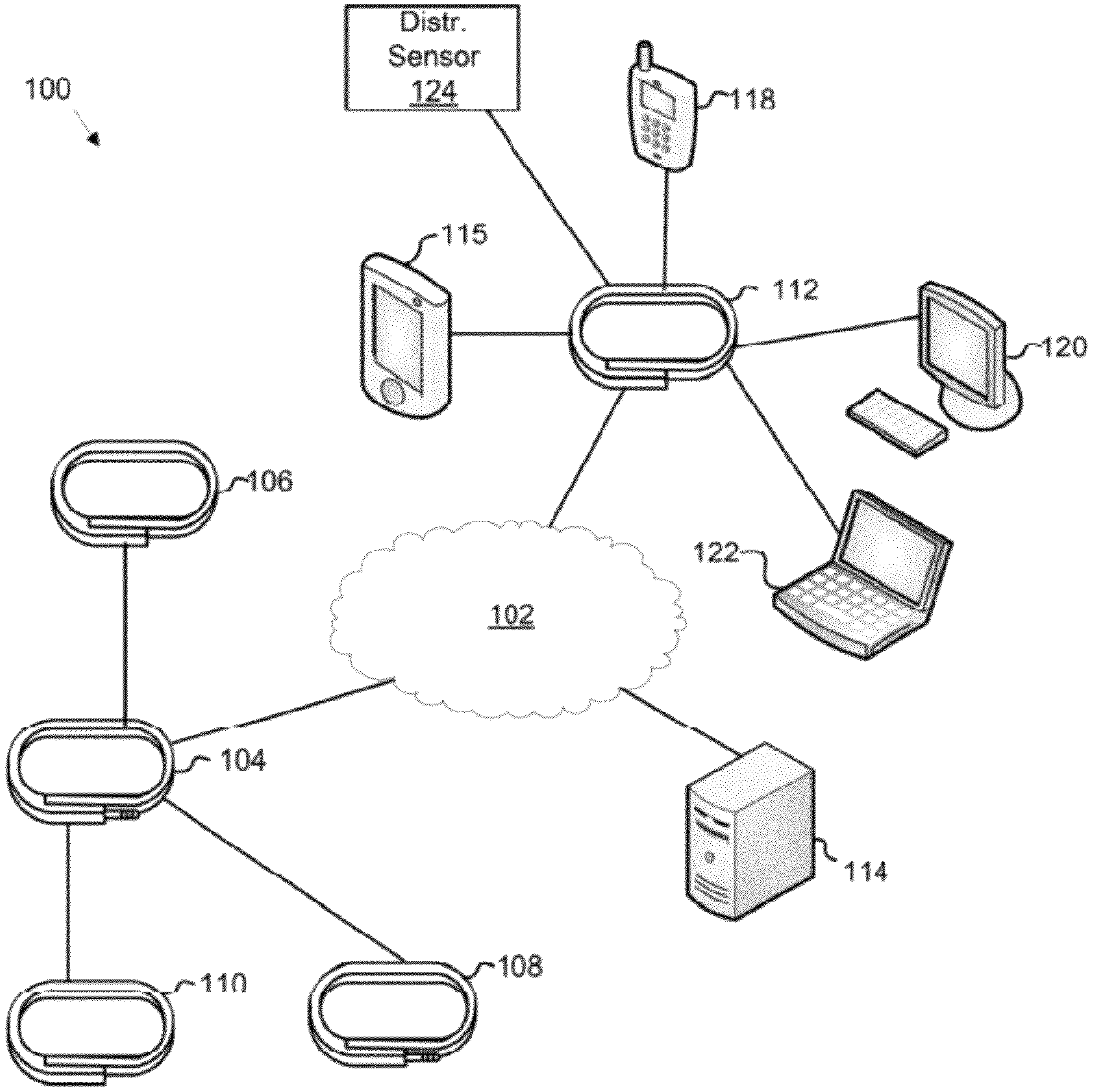
FIG. 1 illustrates an exemplary data-capable strapband system.

FIG. 1 illustrates an exemplary data-capable strapband system. Here, system 100 includes network 102, strapbands (hereafter "bands") 104-112, server 114, mobile computing device 115, mobile communications device 118, computer 120, laptop 122, and distributed sensor 124. Although used interchangeably, "strapband" and "band" may be used to refer to the same or substantially similar data-capable device that may be worn as a strap or band around an arm, leg, ankle, or other bodily appendage or feature. In other examples, bands 104-112 may be attached directly or indirectly to other items, organic or inorganic, animate, or static. In still other examples, bands 104-112 may be used differently.

As described above, bands 104-112 may be implemented as wearable personal data or data capture devices (e.g., data-capable devices; as used herein, "data-capable" may refer to any capability using data from or transferred using indirect or direct data communication links) that are worn by a user around a wrist, ankle, arm, ear, or other appendage, or attached to the body or affixed to clothing. One or more facilities, sensing elements, or sensors, both active and passive, may be implemented as part of bands 104-112 in order to capture various types of data from different sources. Temperature, environmental, temporal, motion, electronic, electrical, chemical, or other types of sensors (including those described below in connection with FIG. 3) may be used in order to gather varying amounts of data, which may be configurable by a user, locally (e.g., using user interface facilities such as buttons, switches, motion-activated/detected command structures (e.g., accelerometer-gathered data from user-initiated motion of bands 104-112), and others) or remotely (e.g., entering rules or parameters in a website or graphical user interface ("GUI") that may be used to modify control systems or signals in firmware, circuitry, hardware, and software implemented (i.e., installed) on bands 104-112). Bands 104-112 may also be implemented as data-capable devices that are configured for data communication using various types of communications infrastructure and media, as described in greater detail below. Bands 104-112 may also be wearable, personal, non-intrusive, lightweight devices that are configured to gather large amounts of personally relevant data that can be used to improve user health, fitness levels, medical conditions, athletic performance, sleeping physiology, and physiological conditions, or used as a sensory-based user interface ("UI") to signal social-related notifications specifying the state of the user through vibration, heat, lights or other sensory based notifications. For example, a social-related notification signal indicating a user is on-line can be transmitted to a recipient, who in turn, receives the notification as, for instance, a vibration.

Using data gathered by bands 104-112, applications may be used to perform various analyses and evaluations that can generate information as to a person's physical (e.g., healthy, sick, weakened, or other states, or activity level), emotional, or mental state (e.g., an elevated body temperature or heart rate may indicate stress, a lowered heart rate and skin temperature, or reduced movement (excessive sleeping), may indicate physiological depression caused by exertion or other factors, chemical data gathered from evaluating outgassing from the skin's surface may be analyzed to determine whether a person's diet is balanced or if various nutrients are lacking, salinity detectors may be evaluated to determine if high, lower, or proper blood sugar levels are present for diabetes management, and others). Generally, bands 104-112 may be configured to gather from sensors locally and remotely.

As an example, band 104 may capture (i.e., record, store, communicate (i.e., send or receive), process, or the like) data from various sources (i.e., sensors that are organic (i.e., installed, integrated, or otherwise implemented with band 104) or distributed (e.g., microphones on mobile computing device 115, mobile communications device 118, computer 120, laptop 122, distributed sensor 124, global positioning system ("GPS") satellites, or others, without limitation)) and exchange data with one or more of bands 106-112, server 114, mobile computing device 115, mobile communications device 118, computer 120, laptop 122, and distributed sensor 124. As shown here, a local sensor may be one that is incorporated, integrated, or otherwise implemented with bands 104-112. A remote or distributed sensor (e.g., mobile computing device 115, mobile communications device 118, computer 120, laptop 122, or, generally, distributed sensor 124) may be sensors that can be accessed, controlled, or otherwise used by bands 104-112. For example, band 112 may be configured to control devices that are also controlled by a given user (e.g., mobile computing device 115, mobile communications device 118, computer 120, laptop 122, and distributed sensor 124). For example, a microphone in mobile communications device 118 may be used to detect, for example, ambient audio data that is used to help identify a person's location, or an ear clip (e.g., a headset as described below) affixed to an ear may be used to record pulse or blood oxygen saturation levels. Additionally, a sensor implemented with a screen on mobile computing device 115 may be used to read a user's temperature or obtain a biometric signature while a user is interacting with data. A further example may include using data that is observed on computer 120 or laptop 122 that provides information as to a user's online behavior and the type of content that she is viewing, which may be used by bands 104-112. Regardless of the type or location of sensor used, data may be transferred to bands 104-112 by using, for example, an analog audio jack, digital adapter (e.g., USB, mini-USB), or other, without limitation, plug, or other type of connector that may be used to physically couple bands 104-112 to another device or system for transferring data and, in some examples, to provide power to recharge a battery (not shown). Alternatively, a wireless data communication interface or facility (e.g., a wireless radio that is configured to communicate data from bands 104-112 using one or more data communication protocols IEEE 802.11a/b/g/n (WiFi), WiMax, ANT™, ZigBee®, Bluetooth®, Near Field Communications ("NFC"), and others)) may be used to receive or transfer data. Further, bands 104-112 may be configured to analyze, evaluate, modify, or otherwise use data gathered, either directly or indirectly.

In some examples, bands 104-112 may be configured to share data with each other or with an intermediary facility, such as a database, website, web service, or the like, which may be implemented by server 114. In some embodiments, server 114 can be operated by a third party providing, for example, social media-related services. An example of such a third party is Facebook®. Bands 104-112 may exchange data with each other directly or via a third party server providing social-media related services. Such data can include personal physiological data and data derived from sensory-based user interfaces ("UI"). Server 114, in some examples, may be implemented using one or more processor-based computing devices or networks, including computing clouds, storage area networks ("SAN"), or the like. As shown, bands 104-112 may be used as a personal data or area network (e.g., "PDN" or "PAN") in which data relevant to a given user or band (e.g., one or more of bands 104-112) may be shared. As shown here, bands 104 and 112 may be configured to exchange data with each other over network 102 or indirectly using server 114. Users of bands 104 and 112 may direct a web browser hosted on a computer (e.g., computer 120, laptop 122, or the like) in order to access, view, modify, or perform other operations with data captured by bands 104 and 112. For example, two runners using bands 104 and 112 may be geographically remote (e.g., users are not geographically in close proximity locally such that bands being used by each user are in direct data communication), but wish to share data regarding their race times (pre, post, or in-race), personal records (i.e., "PR"), target split times, results, performance characteristics (e.g., target heart rate, target $VO_2$ max, and others), and other information. If both runners (i.e., bands 104 and 112) are engaged in a race on the same day, data can be gathered for comparative analysis and other uses. Further, data can be shared in substantially real-time (taking into account any latencies incurred by data transfer rates, network topologies, or other data network factors) as well as uploaded after a given activity or event has been performed. In other words, data can be captured by the user as it is worn and configured to transfer data using, for example, a wireless network connection (e.g., a wireless network interface card, wireless local area network ("LAN") card, cell phone, or the like. Data may also be shared in a temporally asynchronous manner in which a wired data connection (e.g., an analog audio plug (and associated software or firmware) configured to transfer digitally encoded data to encoded audio data that may be transferred between bands 104-112 and a plug configured to receive, encode/decode, and process data exchanged) may be used to transfer data from one or more bands 104-112 to various destinations (e.g., another of bands 104-112, server 114, mobile computing device 115, mobile communications device 118, computer 120, laptop 122, and distributed sensor 124). Bands 104-112 may be implemented with various types of wired and/or wireless communication facilities and are not intended to be limited to any specific technology. For example, data may be transferred from bands 104-112 using an analog audio plug (e.g., TRRS, TRS, or others). In other examples, wireless communication facilities using various types of data communication protocols (e.g., WiFi, Bluetooth®, ZigBee®, ANT™, and others) may be implemented as part of bands 104-112, which may include circuitry, firmware, hardware, radios, antennas, processors, microprocessors, memories, or other electrical, electronic, mechanical, or physical elements configured to enable data communication capabilities of various types and characteristics.

As data-capable devices, bands 104-112 may be configured to collect data from a wide range of sources, including onboard (not shown) and distributed sensors (e.g., server 114, mobile computing device 115, mobile communications device 118, computer 120, laptop 122, and distributed sensor 124) or other bands. Some or all data captured may be personal, sensitive, or confidential and various techniques for providing secure storage and access may be implemented. For example, various types of security protocols and algorithms may be used to encode data stored or accessed by bands 104-112. Examples of security protocols and algorithms include authentication, encryption, encoding, private and public key infrastructure, passwords, checksums, hash codes and hash functions (e.g., SHA, SHA-1, MD-5, and the like), or others may be used to prevent undesired access to data captured by bands 104-112. In other examples, data security for bands 104-112 may be implemented differently.

Bands 104-112 may be used as personal wearable, data capture devices that, when worn, are configured to identify a specific, individual user. By evaluating captured data such as motion data from an accelerometer, biometric data such as heart rate, skin galvanic response, and other biometric data, and using analysis techniques, both long and short-term (e.g., software packages or modules of any type, without limitation), a user may have a unique pattern of behavior or motion and/or biometric responses that can be used as a signature for identification. For example, bands 104-112 may gather data regarding an individual person's gait or other unique biometric, physiological or behavioral characteristics. Using, for example, distributed sensor 124, a biometric signature (e.g., fingerprint, retinal or iris vascular pattern, or others) may be gathered and transmitted to bands 104-112 that, when combined with other data, determines that a given user has been properly identified and, as such, authenticated. When bands 104-112 are worn, a user may be identified and authenticated to enable a variety of other functions such as accessing or modifying data, enabling wired or wireless data transmission facilities (i.e., allowing the transfer of data from bands 104-112), modifying functionality or functions of bands 104-112, authenticating financial transactions using stored data and information (e.g., credit card, PIN, card security numbers, and the like), running applications that allow for various operations to be performed (e.g., controlling physical security and access by transmitting a security code to a reader that, when authenticated, unlocks a door by turning off current to an electromagnetic lock, and others), and others. Different functions and operations beyond those described may be performed using bands 104-112, which can act as secure, personal, wearable, data-capable devices. The number, type, function, configuration, specifications, structure, or other features of system 100 and the above-described elements may be varied and are not limited to the examples provided.

Figure 2:
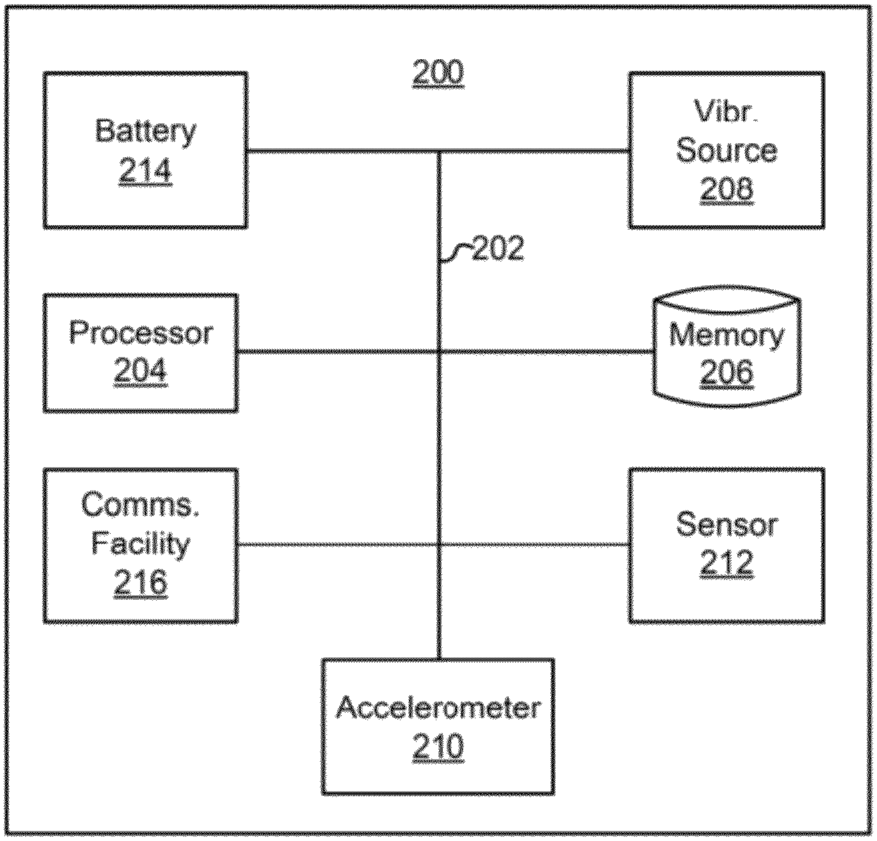
FIG. 2 illustrates a block diagram of an exemplary data-capable strapband.

FIG. 2 illustrates a block diagram of an exemplary data-capable strapband. Here, band 200 includes bus 202, processor 204, memory 206, vibration source 208, accelerometer 210, sensor 212, battery 214, and communications facility 216. In some examples, the quantity, type, function, structure, and configuration of band 200 and the elements (e.g., bus 202, processor 204, memory 206, vibration source 208, accelerometer 210, sensor 212, battery 214, and communications facility 216) shown may be varied and are not limited to the examples provided. As shown, processor 204 may be implemented as logic to provide control functions and signals to memory 206, vibration source 208, accelerometer 210, sensor 212, battery 214, and communications facility 216. Processor 204 may be implemented using any type of processor or microprocessor suitable for packaging within bands 104-112 (FIG. 1). Various types of microprocessors may be used to provide data processing capabilities for band 200 and are not limited to any specific type or capability. For example, a MSP430F5528-type microprocessor manufactured by Texas Instruments of Dallas, Tex. may be configured for data communication using audio tones and enabling the use of an audio plug-and-jack system (e.g., TRRS, TRS, or others) for transferring data captured by band 200. Further, different processors may be desired if other functionality (e.g., the type and number of sensors (e.g., sensor 212)) are varied. Data processed by processor 204 may be stored using, for example, memory 206.

In some examples, memory 206 may be implemented using various types of data storage technologies and standards, including, without limitation, read-only memory ("ROM"), random access memory ("RAM"), dynamic random access memory ("DRAM"), static random access memory ("SRAM"), static/dynamic random access memory ("SDRAM"), magnetic random access memory ("MRAM"), solid state, two and three-dimensional memories, Flash®, and others. Memory 206 may also be implemented using one or more partitions that are configured for multiple types of data storage technologies to allow for non-modifiable (i.e., by a user) software to be installed (e.g., firmware installed on ROM) while also providing for storage of captured data and applications using, for example, RAM. Once captured and/or stored in memory 206, data may be subjected to various operations performed by other elements of band 200.

Vibration source 208, in some examples, may be implemented as a motor or other mechanical structure that functions to provide vibratory energy that is communicated through band 200. As an example, an application stored on memory 206 may be configured to monitor a clock signal from processor 204 in order to provide timekeeping functions to band 200. If an alarm is set for a desired time, vibration source 208 may be used to vibrate when the desired time occurs. As another example, vibration source 208 may be coupled to a framework (not shown) or other structure that is used to translate or communicate vibratory energy throughout the physical structure of band 200. In other examples, vibration source 208 may be implemented differently.

Power may be stored in battery 214, which may be implemented as a battery, battery module, power management module, or the like. Power may also be gathered from local power sources such as solar panels, thermo-electric generators, and kinetic energy generators, among others that are alternatives power sources to external power for a battery. These additional sources can either power the system directly or charge a battery that is used to power the system (e.g., of a strapband). In other words, battery 214 may include a rechargeable, expendable, replaceable, or other type of battery, but also circuitry, hardware, or software that may be used in connection with in lieu of processor 204 in order to provide power management, charge/recharging, sleep, or other functions. Further, battery 214 may be implemented using various types of battery technologies, including Lithium Ion ("LI"), Nickel Metal Hydride ("NiMH"), or others, without limitation. Power drawn as electrical current may be distributed from battery via bus 202, the latter of which may be implemented as deposited or formed circuitry or using other forms of circuits or cabling, including flexible circuitry. Electrical current distributed from battery 204 and managed by processor 204 may be used by one or more of memory 206, vibration source 208, accelerometer 210, sensor 212, or communications facility 216.

As shown, various sensors may be used as input sources for data captured by band 200. For example, accelerometer 210 may be used to gather data measured across one, two, or three axes of motion. In addition to accelerometer 210, other sensors (i.e., sensor 212) may be implemented to provide temperature, environmental; physical, chemical, electrical, or other types of sensed inputs. As presented here, sensor 212 may include one or multiple sensors and is not intended to be limiting as to the quantity or type of sensor implemented. Data captured by band 200 using accelerometer 210 and sensor 212 or data requested from another source (i.e., outside of band 200) may also be exchanged, transferred, or otherwise communicated using communications facility 216. As used herein, "facility" refers to any, some, or all of the features and structures that are used to implement a given set of functions. For example, communications facility 216 may include a wireless radio, control circuit or logic, antenna, transceiver, receiver, transmitter, resistors, diodes, transistors, or other elements that are used to transmit and receive data from band 200. In some examples, communications facility 216 may be implemented to provide a "wired" data communication capability such as an analog or digital attachment, plug, jack, or the like to allow for data to be transferred. In other examples, communications facility 216 may be implemented to provide a wireless data communication capability to transmit digitally encoded data across one or more frequencies using various types of data communication protocols, without limitation. In still other examples, band 200 and the above-described elements may be varied in function, structure, configuration, or implementation and are not limited to those shown and described.

Figure 3:
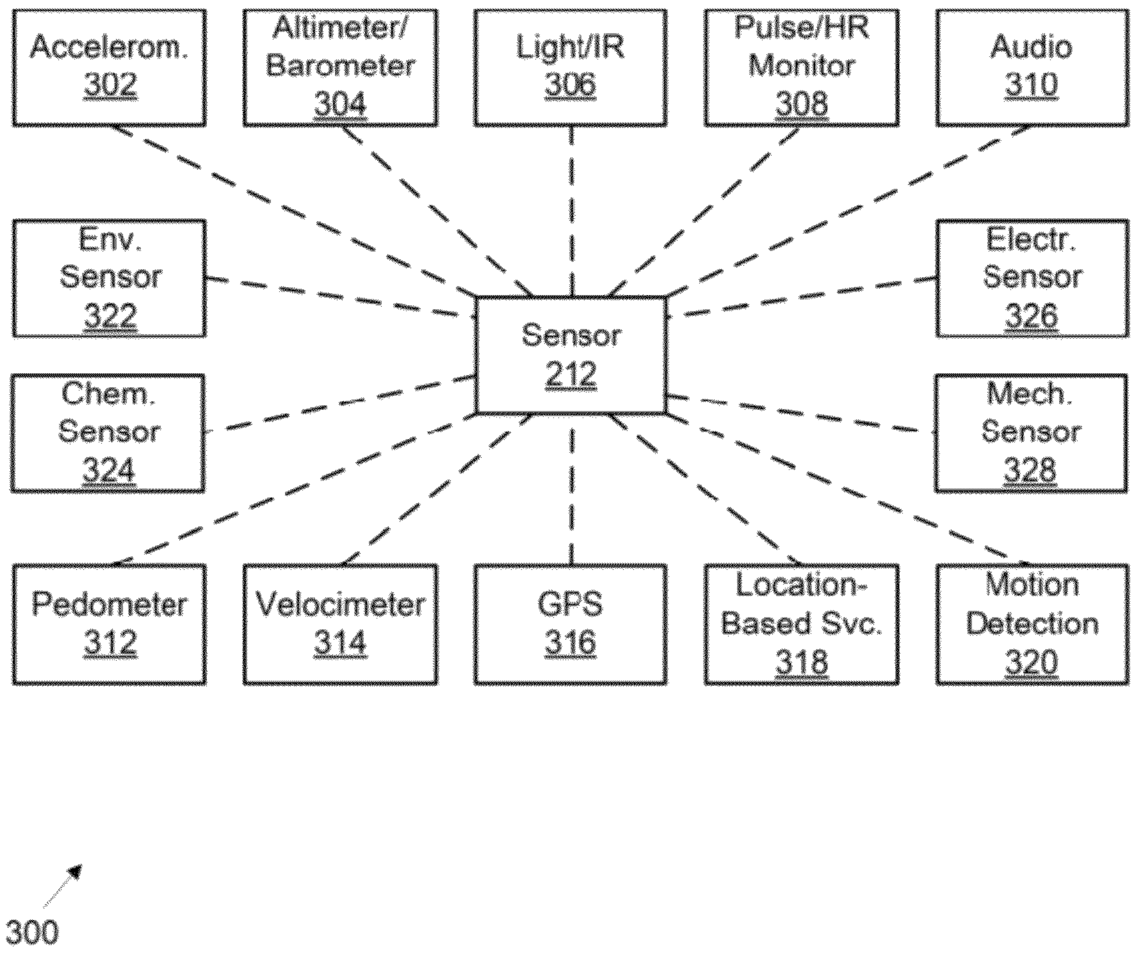
FIG. 3 illustrates sensors for use with an exemplary data-capable strapband.

FIG. 3 illustrates sensors for use with an exemplary data-capable strapband. Sensor 212 may be implemented using various types of sensors, some of which are shown. Like-numbered and named elements may describe the same or substantially similar element as those shown in other descriptions. Here, sensor 212 (FIG. 2) may be implemented as accelerometer 302, altimeter/barometer 304, light/infrared ("IR") sensor 306, pulse/heart rate ("HR") monitor 308, audio sensor (e.g., microphone, transducer, or others) 310, pedometer 312, velocimeter 314, GPS receiver 316, location-based service sensor (e.g., sensor for determining location within a cellular or micro-cellular network, which may or may not use GPS or other satellite constellations for fixing a position) 318, motion detection sensor 320, environmental sensor 322, chemical sensor 324, electrical sensor 326, or mechanical sensor 328.

As shown, accelerometer 302 may be used to capture data associated with motion detection along 1, 2, or 3-axes of measurement, without limitation to any specific type of specification of sensor. Accelerometer 302 may also be implemented to measure various types of user motion and may be configured based on the type of sensor, firmware, software, hardware, or circuitry used. As another example, altimeter/barometer 304 may be used to measure environment pressure, atmospheric or otherwise, and is not limited to any specification or type of pressure-reading device. In some examples, altimeter/barometer 304 may be an altimeter, a barometer, or a combination thereof. For example, altimeter/barometer 304 may be implemented as an altimeter for measuring above ground level ("AGL") pressure in band 200, which has been configured for use by naval or military aviators. As another example, altimeter/barometer 304 may be implemented as a barometer for reading atmospheric pressure for marine-based applications. In other examples, altimeter/barometer 304 may be implemented differently.

Other types of sensors that may be used to measure light or photonic conditions include light/IR sensor 306, motion detection sensor 320, and environmental sensor 322, the latter of which may include any type of sensor for capturing data associated with environmental conditions beyond light. Further, motion detection sensor 320 may be configured to detect motion using a variety of techniques and technologies, including, but not limited to comparative or differential light analysis (e.g., comparing foreground and background lighting), sound monitoring, or others. Audio sensor 310 may be implemented using any type of device configured to record or capture sound.

In some examples, pedometer 312 may be implemented using devices to measure various types of data associated with pedestrian-oriented activities such as running or walking. Footstrikes, stride length, stride length or interval, time, and other data may be measured. Velocimeter 314 may be implemented, in some examples, to measure velocity (e.g., speed and directional vectors) without limitation to any particular activity. Further, additional sensors that may be used as sensor 212 include those configured to identify or obtain location-based data. For example, GPS receiver 316 may be used to obtain coordinates of the geographic location of band 200 using, for example, various types of signals transmitted by civilian and/or military satellite constellations in low, medium, or high earth orbit (e.g., "LEO," "MEO," or "GEO"). In other examples, differential GPS algorithms may also be implemented with GPS receiver 316, which may be used to generate more precise or accurate coordinates. Still further, location-based services sensor 318 may be implemented to obtain location-based data including, but not limited to location, nearby services or items of interest, and the like. As an example, location-based services sensor 318 may be configured to detect an electronic signal, encoded or otherwise, that provides information regarding a physical locale as band 200 passes. The electronic signal may include, in some examples, encoded data regarding the location and information associated therewith. Electrical sensor 326 and mechanical sensor 328 may be configured to include other types (e.g., haptic, kinetic, piezoelectric, piezomechanical, pressure, touch, thermal, and others) of sensors for data input to band 200, without limitation. Other types of sensors apart from those shown may also be used, including magnetic flux sensors such as solid-state compasses and the like, including gyroscopic sensors. While the present illustration provides numerous examples of types of sensors that may be used with band 200 (FIG. 2), others not shown or described may be implemented with or as a substitute for any sensor shown or described.

Figure 4:
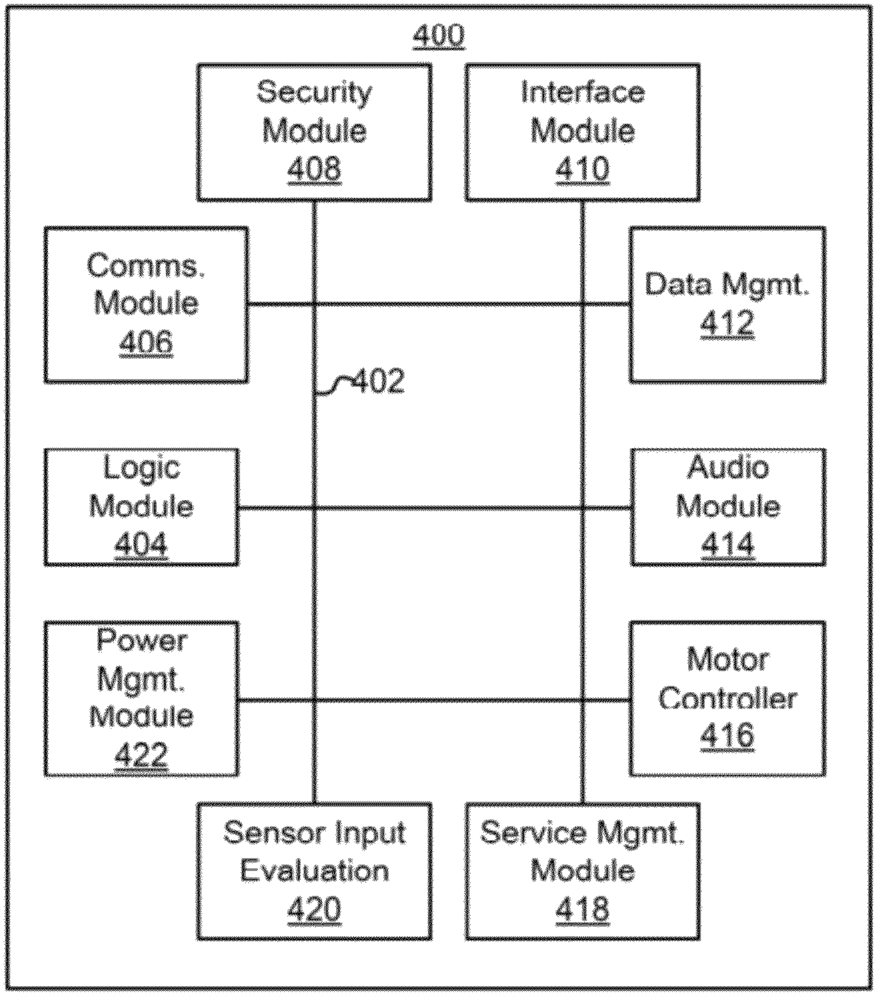
FIG. 4 illustrates an application architecture for an exemplary data-capable strapband.

FIG. 4 illustrates an application architecture for an exemplary data-capable strapband. Here, application architecture 400 includes bus 402, logic module 404, communications module 406, security module 408, interface module 410, data management 412, audio module 414, motor controller 416, service management module 418, sensor input evaluation module 420, and power management module 422. In some examples, application architecture 400 and the above-listed elements (e.g., bus 402, logic module 404, communications module 406, security module 408, interface module 410, data management 412, audio module 414, motor controller 416, service management module 418, sensor input evaluation module 420, and power management module 422) may be implemented as software using various computer programming and formatting languages such as Java, C++, C, and others. As shown here, logic module 404 may be firmware or application software that is installed in memory 206 (FIG. 2) and executed by processor 204 (FIG. 2). Included with logic module 404 may be program instructions or code (e.g., source, object, binary executables, or others) that, when initiated, called, or instantiated, perform various functions.

For example, logic module 404 may be configured to send control signals to communications module 406 in order to transfer, transmit, or receive data stored in memory 206, the latter of which may be managed by a database management system ("DBMS") or utility in data management module 412. As another example, security module 408 may be controlled by logic module 404 to provide encoding, decoding, encryption, authentication, or other functions to band 200 (FIG. 2). Alternatively, security module 408 may also be implemented as an application that, using data captured from various sensors and stored in memory 206 (and accessed by data management module 412) may be used to provide identification functions that enable band 200 to passively identify a user or wearer of band 200. Still further, various types of security software and applications may be used and are not limited to those shown and described.

Interface module 410, in some examples, may be used to manage user interface controls such as switches, buttons, or other types of controls that enable a user to manage various functions of band 200. For example, a 4-position switch may be turned to a given position that is interpreted by interface module 410 to determine the proper signal or feedback to send to logic module 404 in order to generate a particular result. In other examples, a button (not shown) may be depressed that allows a user to trigger or initiate certain actions by sending another signal to logic module 404. Still further, interface module 410 may be used to interpret data from, for example, accelerometer 210 (FIG. 2) to identify specific movement or motion that initiates or triggers a given response. In other examples, interface module 410 may be used to manage different types of displays (e.g., light-emitting diodes (LEDs), interferometric modulator display (IMOD), electrophoretic ink (E Ink), organic light-emitting diode (OLED), etc.). In other examples, interface module 410 may be implemented differently in function, structure, or configuration and is not limited to those shown and described.

As shown, audio module 414 may be configured to manage encoded or unencoded data gathered from various types of audio sensors. In some examples, audio module 414 may include one or more codecs that are used to encode or decode various types of audio waveforms. For example, analog audio input may be encoded by audio module 414 and, once encoded, sent as a signal or collection of data packets, messages, segments, frames, or the like to logic module 404 for transmission via communications module 406. In other examples, audio module 414 may be implemented differently in function, structure, configuration, or implementation and is not limited to those shown and described. Other elements that may be used by band 200 include motor controller 416, which may be firmware or an application to control a motor or other vibratory energy source (e.g., vibration source 208 (FIG. 2)). Power used for band 200 may be drawn from battery 214 (FIG. 2) and managed by power management module 422, which may be firmware or an application used to manage, with or without user input, how power is consumer, conserved, or otherwise used by band 200 and the above-described elements, including one or more sensors (e.g., sensor 212 (FIG. 2), sensors 302-328 (FIG. 3)). With regard to data captured, sensor input evaluation module 420 may be a software engine or module that is used to evaluate and analyze data received from one or more inputs (e.g., sensors 302-328) to band 200. When received, data may be analyzed by sensor input evaluation module 420, which may include custom or "Off-the-shelf" analytics packages that are configured to provide application-specific analysis of data to determine trends, patterns, and other useful information. In other examples, sensor input module 420 may also include firmware or software that enables the generation of various types and formats of reports for presenting data and any analysis performed thereupon.

Another element of application architecture 400 that may be included is service management module 418. In some examples, service management module 418 may be firmware, software, or an application that is configured to manage various aspects and operations associated with executing software-related instructions for band 200. For example, libraries or classes that are used by software or applications on band 200 may be served from an online or networked source. Service management module 418 may be implemented to manage how and when these services are invoked in order to ensure that desired applications are executed properly within application architecture 400. As discrete sets, collections, or groupings of functions, services used by band 200 for various purposes ranging from communications to operating systems to call or document libraries may be managed by service management module 418. Alternatively, service management module 418 may be implemented differently and is not limited to the examples provided herein. Further, application architecture 400 is an example of a software/system/application-level architecture that may be used to implement various software-related aspects of band 200 and may be varied in the quantity, type, configuration, function, structure, or type of programming or formatting languages used, without limitation to any given example.

Figure 5A:
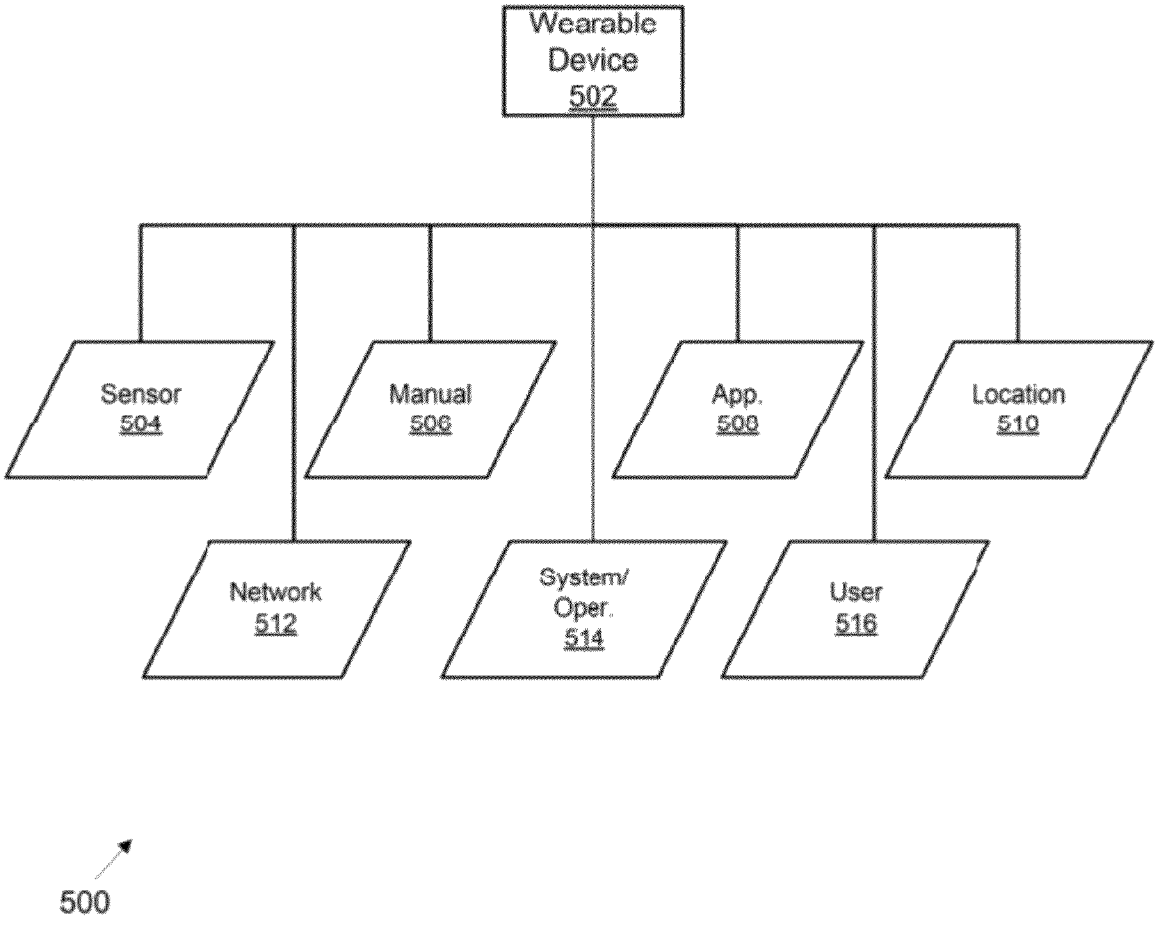
FIG. 5A illustrates representative data types for use with an exemplary data-capable strapband.

FIG. 5A illustrates representative data types for use with an exemplary data-capable strapband. Here, in 500, wearable device 502 may capture various types of data, including, but not limited to sensor data 504, manually-entered data 506, application data 508, location data 510, network data 512, system/operating data 514, and user data 516. Various types of data may be captured from sensors, such as those described above in connection with FIG. 3. Manually-entered data, in some examples, may be data or inputs received directly and locally by band 200 (FIG. 2). In other examples, manually-entered data may also be provided through a third-party website that stores the data in a database and may be synchronized from server 114 (FIG. 1) with one or more of bands 104-112. Other types of data that may be captured including application data 508 and system/operating data 514, which may be associated with firmware, software, or hardware installed or implemented on band 200. Further, location data 510 may be used by wearable device 502, as described above. User data 516, in some examples, may be data that include profile data, preferences, rules, or other information that has been previously entered by a given user of wearable device 502. Further, network data 512 may be data is captured by wearable device with regard to routing tables, data paths, network or access availability (e.g., wireless network access availability), and the like. Other types of data may be captured by wearable device 502 and are not limited to the examples shown and described. Additional context-specific examples of types of data captured by bands 104-112 (FIG. 1) are provided below.

Figure 5B:
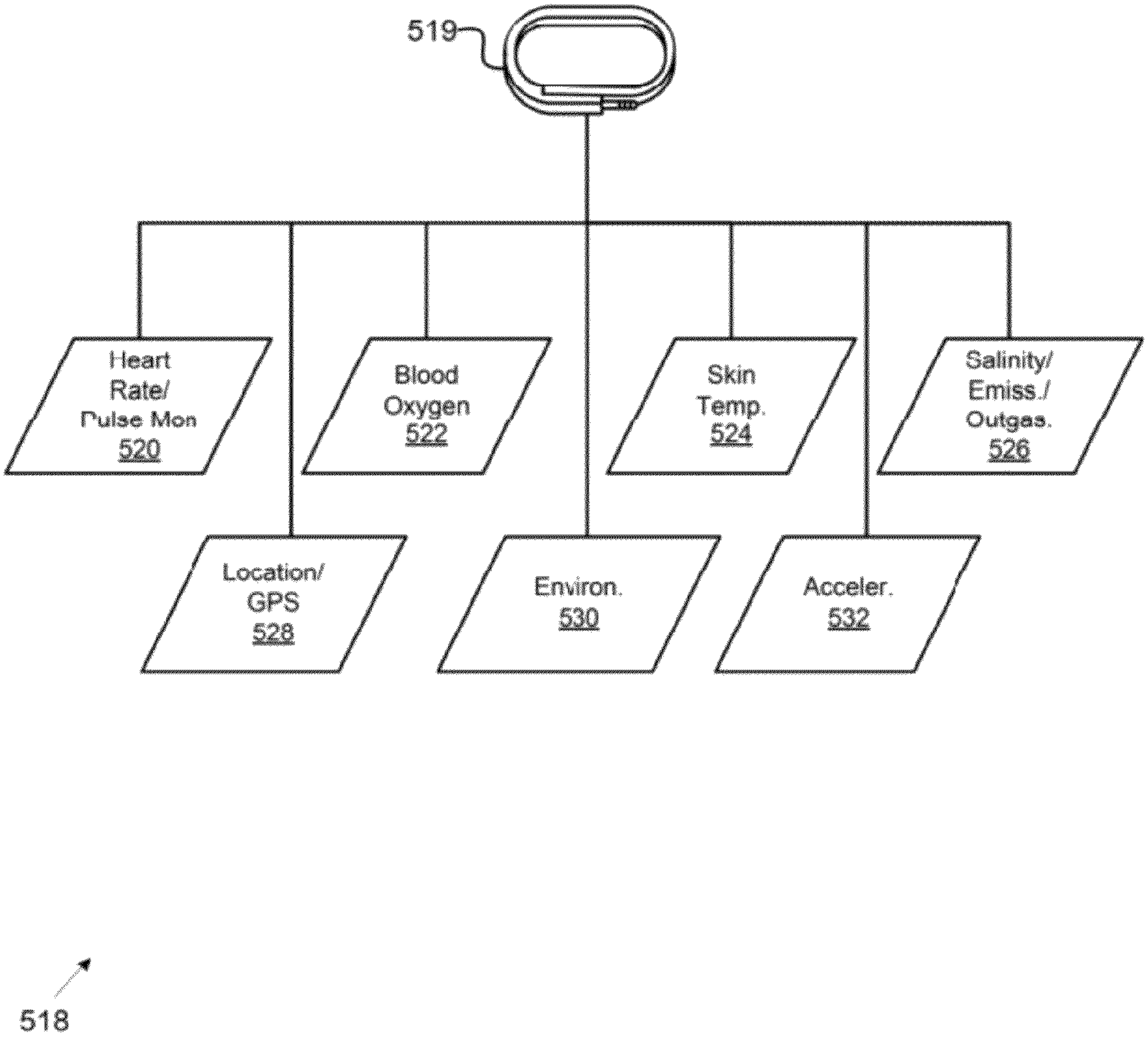
FIG. 5B illustrates representative data types for use with an exemplary data-capable strapband in fitness-related activities.

FIG. 5B illustrates representative data types for use with an exemplary data-capable strapband in fitness-related activities. Here, in 518, band 519 may be configured to capture types (i.e., categories) of data such as heart rate/pulse monitoring data 520, blood oxygen level data 522, skin temperature data 524, salinity/emission/outgassing data 526, location/GPS data 528, environmental data 530, and accelerometer data 532. As an example, a runner may use or wear band 519 to obtain data associated with his physiological condition (i.e., heart rate/pulse monitoring data 520, skin temperature, salinity/emission/outgassing data 526, among others), athletic efficiency (i.e., blood oxygen level data 522), and performance (i.e., location/GPS data 528 (e.g., distance or laps run), environmental data 530 (e.g., ambient temperature, humidity, pressure, and the like), accelerometer 532 (e.g., biomechanical information, including gait, stride, stride length, among others)). Other or different types of data may be captured by band 519, but the above-described examples are illustrative of some types of data that may be captured by band 519. Further, data captured may be uploaded to a website or online/networked destination for storage and other uses. For example, fitness-related data may be used by applications that are downloaded from a "fitness marketplace" where athletes may find, purchase, or download applications for various uses. Some applications may be activity-specific and thus may be used to modify or alter the data capture capabilities of band 519 accordingly. For example, a fitness marketplace may be a website accessible by various types of mobile and non-mobile clients to locate applications for different exercise or fitness categories such as running, swimming, tennis, golf, baseball, football, fencing, and many others. When downloaded, a fitness marketplace may also be used with user-specific accounts to manage the retrieved applications as well as usage with band 519, or to use the data to provide services such as online personal coaching or targeted advertisements. More, fewer, or different types of data may be captured for fitness-related activities.

Figure 5C:
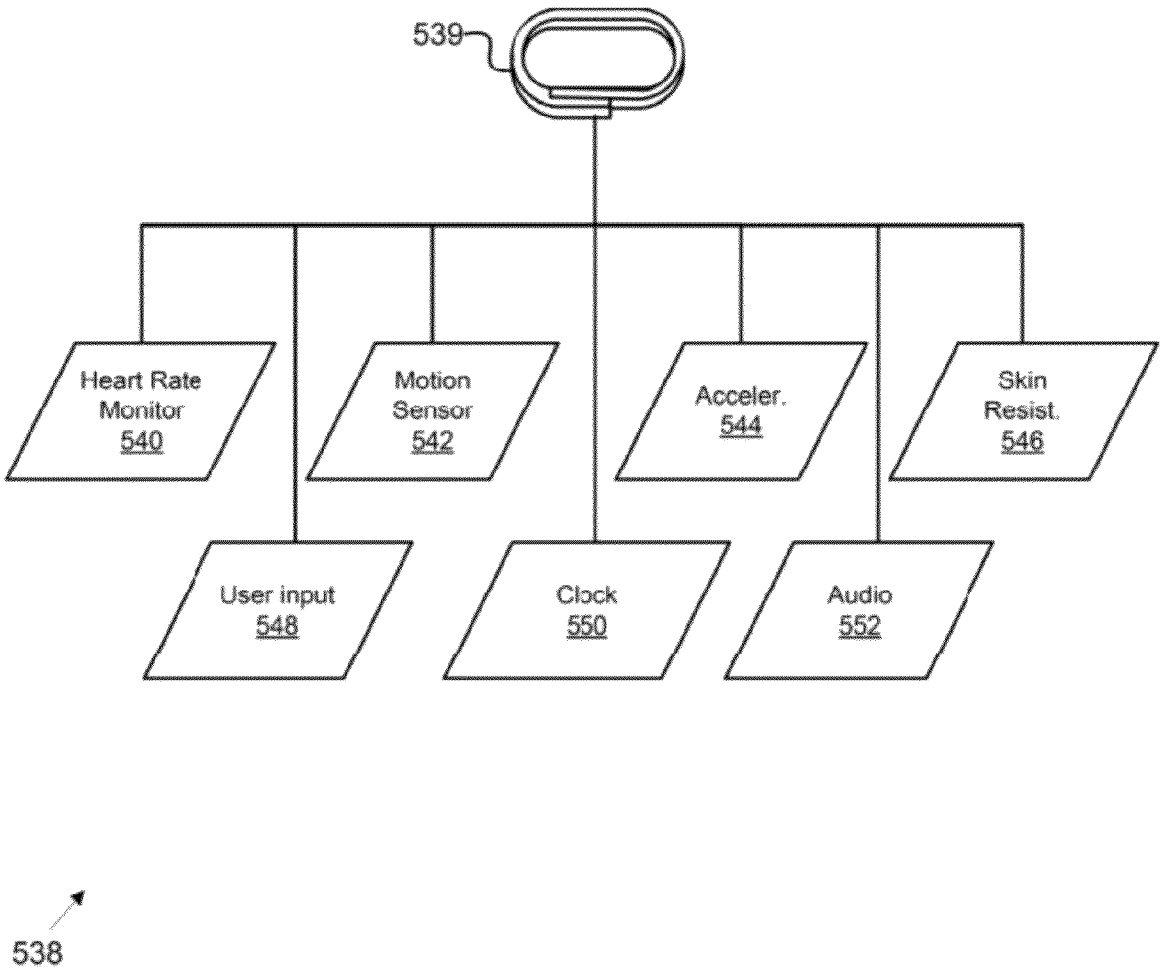
FIG. 5C illustrates representative data types for use with an exemplary data-capable strapband in sleep management activities.

FIG. 5C illustrates representative data types for use with an exemplary data-capable strapband in sleep management activities. Here, in 538, band 539 may be used for sleep management purposes to track various types of data, including heart rate monitoring data 540, motion sensor data 542, accelerometer data 544, skin resistivity data 546, user input data 548, clock data 550, and audio data 552. In some examples, heart rate monitor data 540 may be captured to evaluate rest, waking, or various states of sleep. Motion sensor data 542 and accelerometer data 544 may be used to determine whether a user of band 539 is experiencing a restful or fitful sleep. For example, some motion sensor data 542 may be captured by a light sensor that measures ambient or differential light patterns in order to determine whether a user is sleeping on her front, side, or back. Accelerometer data 544 may also be captured to determine whether a user is experiencing gentle or violent disruptions when sleeping, such as those often found in afflictions of sleep apnea or other sleep disorders. Further, skin resistivity data 546 may be captured to determine whether a user is ill (e g, running a temperature, sweating, experiencing chills, clammy skin, and others). Still further, user input data may include data input by a user as to how and whether band 539 should trigger vibration source 208 (FIG. 2) to wake a user at a given time or whether to use a series of increasing or decreasing vibrations to trigger a waking state. Clock data (550) may be used to measure the duration of sleep or a finite period of time in which a user is at rest. Audio data may also be captured to determine whether a user is snoring and, if so, the frequencies and amplitude therein may suggest physical conditions that a user may be interested in knowing (e.g., snoring, breathing interruptions, talking in one's sleep, and the like). More, fewer, or different types of data may be captured for sleep management-related activities.

Figure 5D:
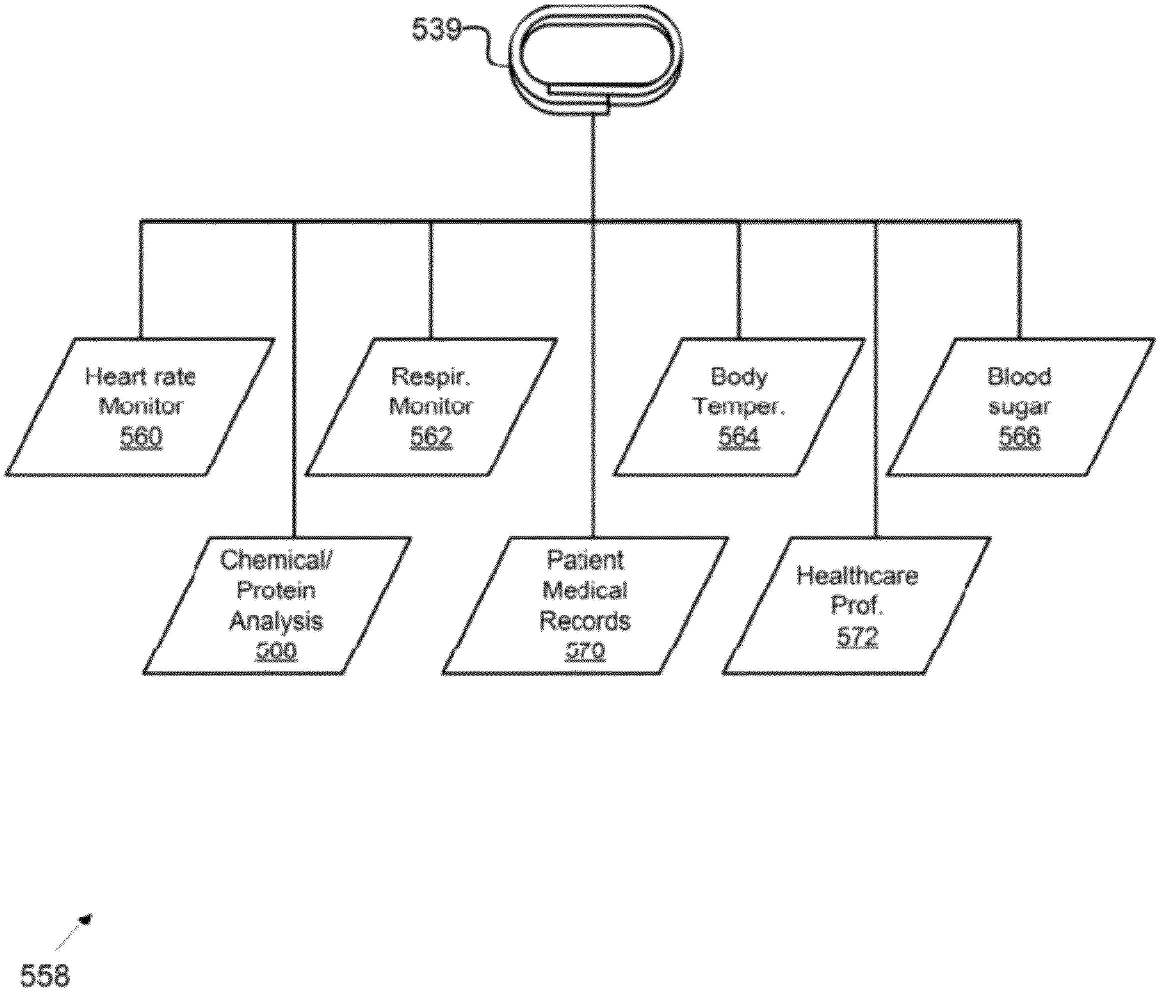
FIG. 5D illustrates representative data types for use with an exemplary data-capable strapband in medical-related activities.

FIG. 5D illustrates representative data types for use with an exemplary data-capable strapband in medical-related activities. Here, in 558, band 539 may also be configured for medical purposes and related-types of data such as heart rate monitoring data 560, respiratory monitoring data 562, body temperature data 564, blood sugar data 566, chemical protein/analysis data 568, patient medical records data 570, and healthcare professional (e.g., doctor, physician, registered nurse, physician's assistant, dentist, orthopedist, surgeon, and others) data 572. In some examples, data may be captured by band 539 directly from wear by a user. For example, band 539 may be able to sample and analyze sweat through a salinity or moisture detector to identify whether any particular chemicals, proteins, hormones, or other organic or inorganic compounds are present, which can be analyzed by band 539 or communicated to server 114 to perform further analysis. If sent to server 114, further analyses may be performed by a hospital or other medical facility using data captured by band 539. In other examples, more, fewer, or different types of data may be captured for medical-related activities.

Figure 5E:
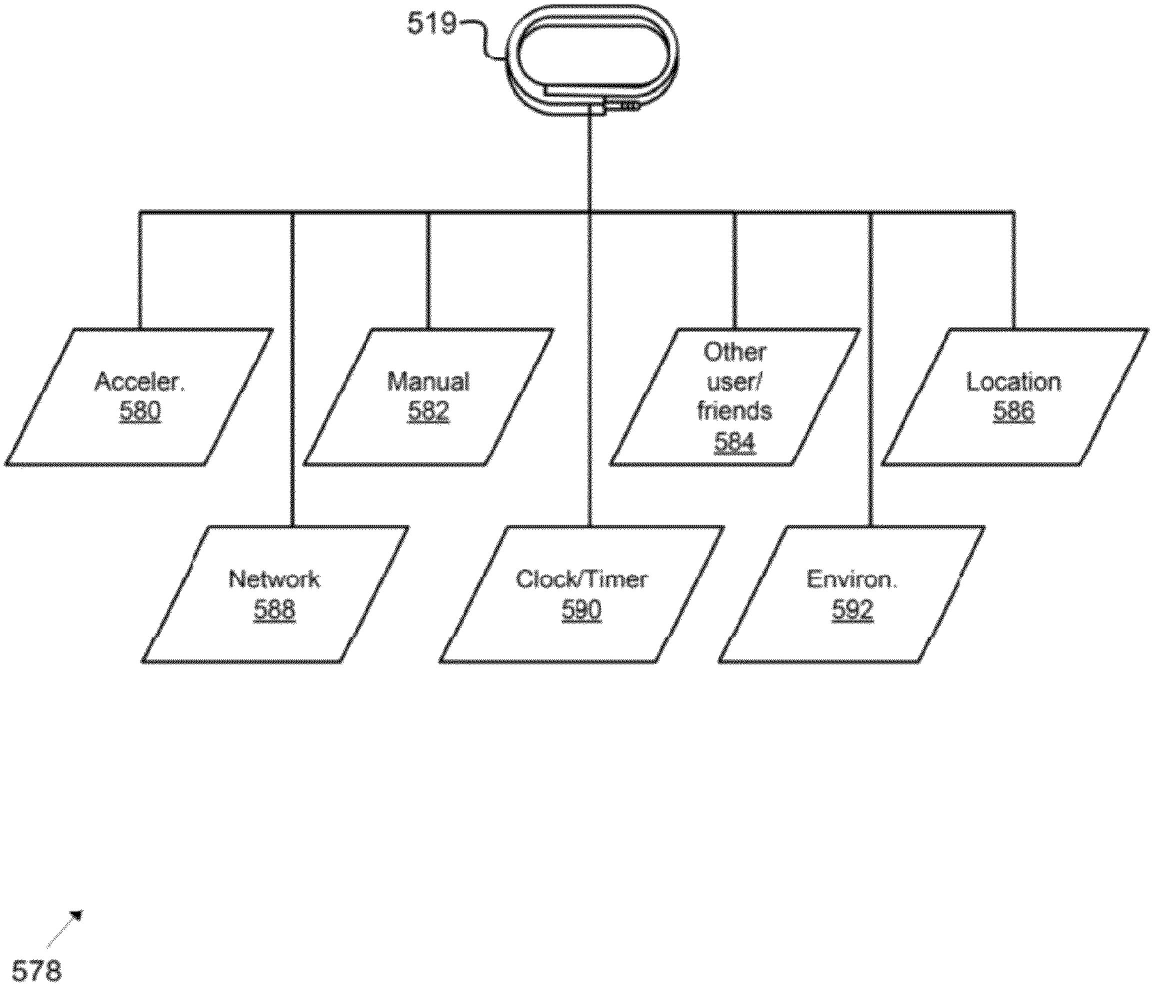
FIG. 5E illustrates representative data types for use with an exemplary data-capable strapband in social media/networking-related activities.

FIG. 5E illustrates representative data types for use with an exemplary data-capable strapband in social media/networking-related activities. Examples of social media/networking-related activities include related to Internet-based Social Networking Services ("SNS"), such as Facebook®, Twitter®, etc. Here, in 578, band 519, shown with an audio data plug, may be configured to capture data for use with various types of social media and networking-related services, websites, and activities. Accelerometer data 580, manual data 582, other user/friends data 584, location data 586, network data 588, clock/timer data 590, and environmental data 592 are examples of data that may be gathered and shared by, for example, uploading data from band 519 using, for example, an audio plug such as those described herein. As another example, accelerometer data 580 may be captured and shared with other users to share motion, activity, or other movement-oriented data. Manual data 582 may be data that a given user also wishes to share with other users. Likewise, other user/friends data 584 may be from other bands (not shown) that can be shared or aggregated with data captured by band 519. Location data 586 for band 519 may also be shared with other users. In other examples, a user may also enter manual data 582 to prevent other users or friends from receiving updated location data from band 519. Additionally, network data 588 and clock/timer data may be captured and shared with other users to indicate, for example, activities or events that a given user (i.e., wearing band 519) was engaged at certain locations. Further, if a user of band 519 has friends who are not geographically located in close or near proximity (e.g., the user of band 519 is located in San Francisco and her friend is located in Rome), environmental data can be captured by band 519 (e.g., weather, temperature, humidity, sunny or overcast (as interpreted from data captured by a light sensor and combined with captured data for humidity and temperature), among others). In other examples, more, fewer, or different types of data may be captured for medical-related activities.

Figure 6A:
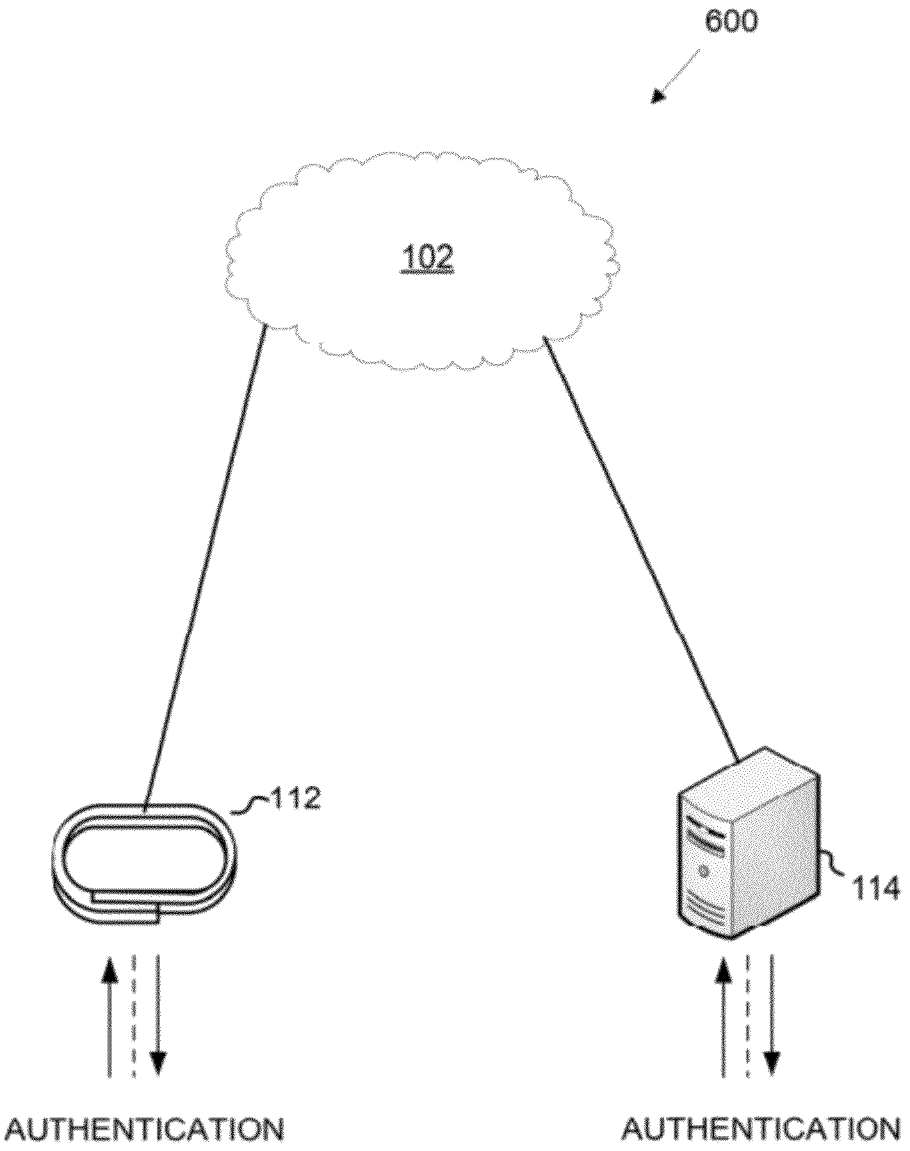
FIG. 6A illustrates an exemplary system for wearable device data security.

FIG. 6A illustrates an exemplary system for wearable device data security. Exemplary system 600 comprises network 102, band 112, and server 114. As described above, band 112 may capture data that is personal, sensitive, or confidential. In some examples, security protocols and algorithms, as described above, may be implemented on band 112 to authenticate a user's identity. This authentication may be implemented to prevent unwanted use or access by others. In other examples, the security protocols and algorithms may be performed by server 114, in which case band 112 may communicate with server 114 via network 102 to authenticate a user's identity. Use of the band to capture, evaluate or access a user's data may be predicated on authentication of the user's identity.

In some examples, band 112 may identify of a user by the user's unique pattern of behavior or motion. Band 112 may capture and evaluate data from a user to create a unique key personal to the user. The key may be associated with an individual user's physical attributes, including gait, biometric or physiological signatures (e.g., resting heart rate, skin temperature, salinity of emitted moisture, etc.), or any other sets of data that may be captured by band 112, as described in more detail above. The key may be based upon a set of physical attributes that are known in combination to be unique to a user. Once the key is created based upon the predetermined, or pre-programmed, set of physical attributes, it may be used in an authentication process to authenticate a user's identity, and prevent access to, or capture and evaluation of, data by an unauthorized user. In some examples, authentication using the key may be carried out directly by band 112. In other examples, band 112 may be used to authenticate with other bands (not shown) that may be owned by the same individual (i.e., user). Multiple bands, for example, that are owned by the same individual may be configured for different sensors or types of activities, but may also be configured to share data between them. In order to prevent unauthenticated or unauthorized individuals from accessing a given user's data, band 112 may be configured using various types of authentication, identification, or other security techniques among one or more bands, including band 112. As an example, band 112 may be in direct data communication with other bands (not shown) or indirectly through an authentication system or service, which may be implemented using server 114. In still other examples, band 112 may send data to server 114, which in turn carries out the authentication and returns a prompt or notification to band 112 to unlock band 112 for use. In other examples, data security and identity authentication for band 112 may be implemented differently.

Figure 6B:
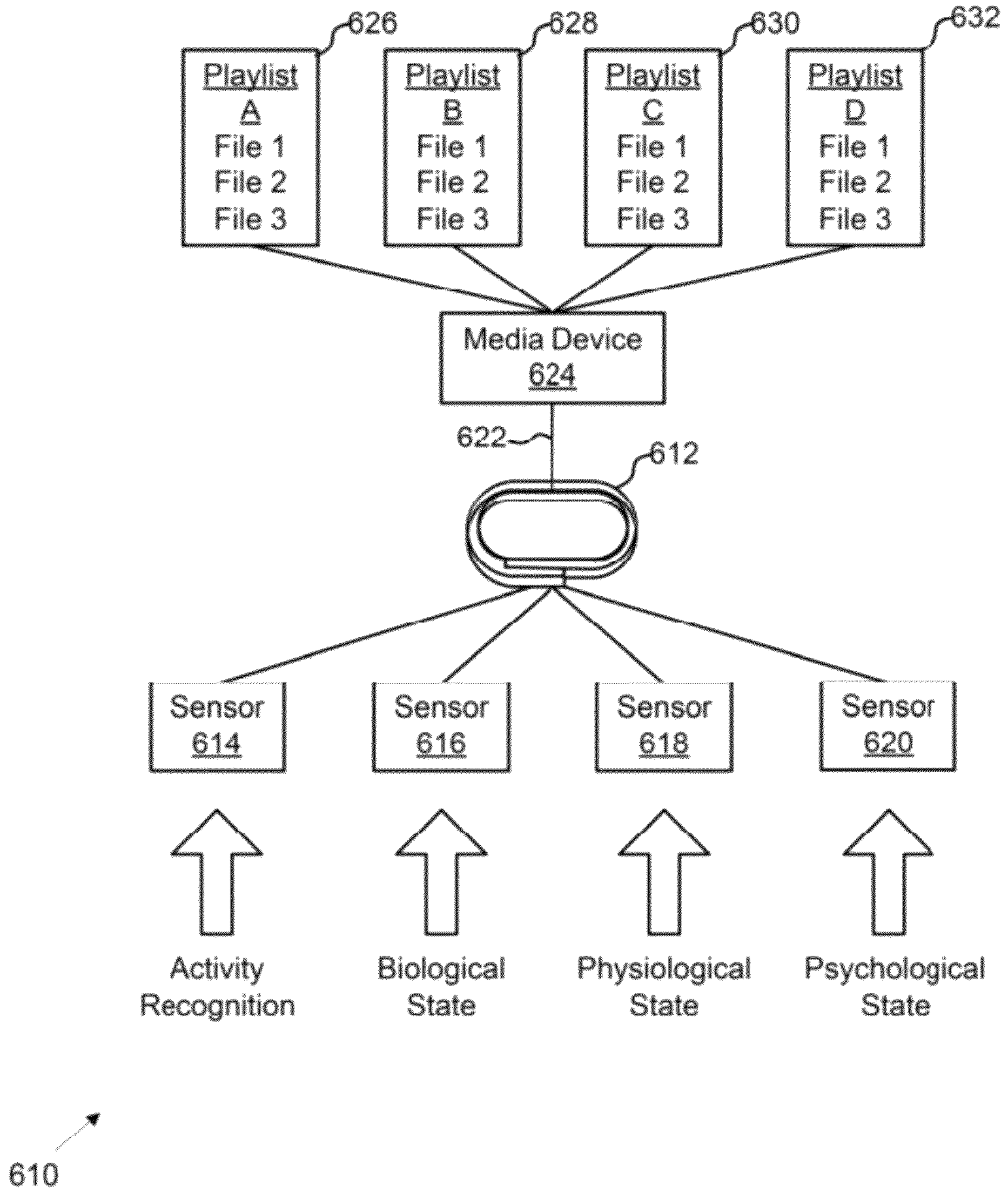
FIG. 6B illustrates an exemplary system for media device, application, and content management using sensory input.

FIG. 6B illustrates an exemplary system for media device, application, and content management using sensory input. Here, system 660 includes band 612, sensors 614-620, data connection 622, media device 624, and playlists 626-632. As used throughout this description, band 612 may also be referred to interchangeably as a "wearable device." Sensors 614-620 may be implemented using any type of sensor such as a 2 or 3-axis accelerometer, temperature, humidity, barometric pressure, skin resistivity (i.e., galvanic skin response (GSR)), pedometer, or any other type of sensor, without limitation. Data connection 622 may be implemented as any type of wired or wireless connection using any type of data communication protocol (e.g., Bluetooth®, wireless fidelity (i.e., WiFi), LAN, WAN, MAN, near field communication (NFC), or others, without limitation) between band 612 and media device 624. Data connection 622 may be configured to transfer data bi-directionally or in a single direction between media device 624 and band 612. In some examples, data connection 622 may be implemented by using a 3.5 mm audio jack that connects to an appropriate plug (i.e., outlet) and transmits electrical signals that may be interpreted for transferring data. Alternatively, a wireless radio, transmitter, transceiver, or the like may be implemented with band 612 and, when a motion is detected via an installed accelerometer on the band 612, initiates a transmission of a control signal to media device 624 to, for example, begin playing playlist 630, change from one playlist to another, forward to another song on given playlist, and the like.

In some examples, on or more of playlists 626-632 may reside locally (e.g., on media device 624, etc.). In other examples, one or more of playlists 626-632 may be implemented remotely (e.g., in the Cloud, etc.). In some examples, one or more of playlists 626-632 may be created from songs or groups of songs (e.g., other playlists, etc.) that are shared with the user through an SNS, a radio station website, or other remote source. In some examples, one or more of playlists 626-632 may be created using sensory data gathered by band 612. In other examples, one or more of playlists 626-632 may be created using sensory data gathered by other data-capable bands, worn by the user also wearing band 612, or worn by another user.

As shown, media device 624 may be any type of device that is configured to display, play, interact, show, or otherwise present various types of media, including audio, visual, graphical, images, photographical, video, rich media, multimedia, or a combination thereof, without limitation. Examples of media device 624 may include audio playback devices (e.g., players configured to play various formats of audio and video files including .mp3, may, and others, without limitation), connected or wireless (e.g., Bluetooth®, WiFi, WLAN, and others) speakers, radios, audio devices installed on portable, desktop, or mobile computing devices, and others. Playlists 626-632 may be configured to play various types of files of any format, as representatively illustrated by “File 1, File 2, File 3” in association with each playlist. Each file on a given playlist may be any type of media and played using various types of formats or applications implemented on media device 624. As described above, these files may reside locally or remotely.

As an example, sensors 614-620 may detect various types of inputs locally (i.e., on band 612) or remotely (i.e., on another device that is in data communication with band 612) such as an activity or motion (e.g., running, walking, swimming, jogging, jumping, shaking, turning, cycling, or others), a biological state (e.g., healthy, ill, diabetic, or others), a physiological state (e.g., normal gait, limping, injured, or others), or a psychological state (e.g., happy, depressed, angry, and the like). Other types of inputs may be sensed by sensors 614-620, which may be configured to gather data and transmit that information to an application that uses the data to infer various conclusions related to the above-described states or activities, among others. Based on the data gathered by sensors 614-620 and, in some examples, user or system-specified parameters, band 612 may be configured to generate control signals (e.g., electrical or electronic signals that are generated at various types of amount of voltage in order to produce, initiate, trigger, or otherwise cause certain actions or functions to occur). For example, data may be transferred from sensors 614-620 to band 612 indicating that a user has started running. Band 612 may be configured to generate a control signal to media device 624 over data connection 622 to initiate playing files in a given playlist in order. A shake of a user’s wrist, for example, in a given direction or axis may cause band 612 to generate a different control signal that causes media device 624 to change the play order, to change files, to forward to another file, to playback from a different part of the currently played file, or the like. In some examples, a given movement (e.g., a user shakes her wrist (on which band 612 is worn)) may be resolved into data associated with motion occurring along each of 3-different axes. Band 612 may be configured to detect motion using an accelerometer (not shown), which then resolves the detected motion into data associated with three separate axes of movement, translated into data or electrical control signals that may be stored in a memory that is local and/or remote to band 612. Further, the stored data of a given motion may be associated with a specific action such that, when detected, control signals may be generated by band 612 and sent over data connection 622 to media device 624 or other types of devices, without limitation.

As another example, if sensor 616 detects that a user is lying prone and her heart rate is slowing (e.g., decelerating towards a previously-recorded resting heart rate), a control signal may be generated by band 612 to begin playback of Brahms’ Lullaby via a Bluetooth®-connected headset speaker (i.e., media device 624). Additionally, if sensor 618 detects a physiological state change (e.g., a user is walking with a gait or limp as opposed to normally observed physiological behavior), media device 624 may be controlled by band 612 to initiate playback of a file on a graphical user interface of a connected device (e.g., a mobile computing or communications device) that provides a tutorial on running injury recovery and prevent. As yet another example, if sensor 620 detects one or more parameters that a user is happy (e.g., sensor 620 detects an accelerated, but regular heart rate, rapid or erratic movements, increased body temperature, increased speech levels, and the like), band 612 may send a control signal to media device 624 to display an inquiry as to whether the user wishes to hear songs played from her “happy playlist” (not shown). The above-described examples are provided for purposes of illustrating the use of managing various types of media and media content using band 612, but many others may be implemented without restriction to those provided.

Figure 6C:
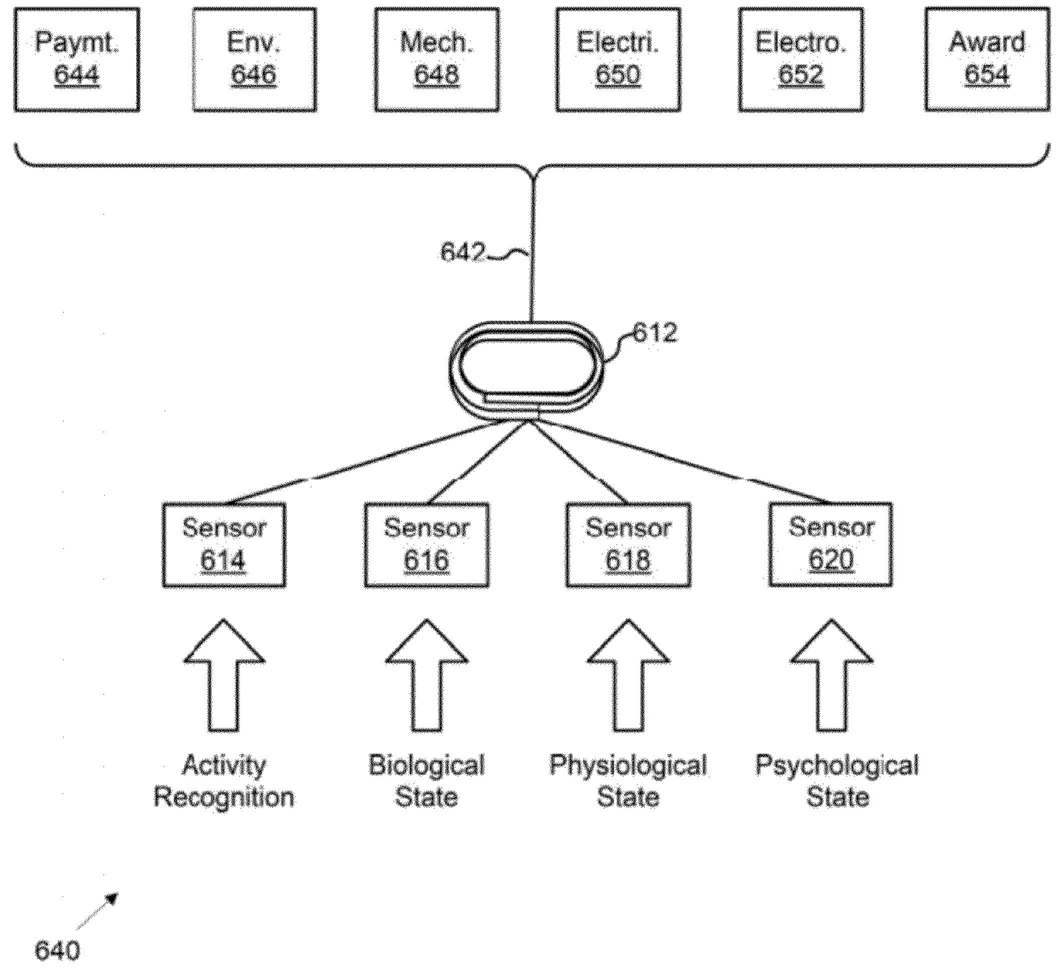
FIG. 6C illustrates an exemplary system for device control using sensory input.

FIG. 6C illustrates an exemplary system for device control using sensory input. Here, system 640 includes band 612, sensors 614-620, data connection 642, and device types 644-654. Those elements shown that are like-named and numbered may be designed, implemented, or configured as described above or differently. As shown, the detection by band 612 of a given activity, biological state, physiological state, or psychological state may be gathered as data from sensors 614-620 and used to generate various types of control signals. Control signals, in some examples, may be transmitted via a wired or wireless data connection (e.g., data connection 642) to one or multiple device types 644-654 that are in data communication with band 612. Device types 644-654 may be any type of device, apparatus, application, or other mechanism that may be in data connection with, coupled to (indirectly or directly), paired (e.g., via Bluetooth® or another data communication protocol), or otherwise configured to receive control signals from band 612. Various types of devices, including another device that may be in data communication with band 612 (i.e., a wearable device), may be any type of physical, mechanical, electrical, electronic, chemical, biomechanical, biochemical, bioelectrical, or other type of device, without limitation.

As shown, band 612 may send control signals to various types of devices (e.g., device types 644-654), including payment systems (644), environmental (646), mechanical (648), electrical (650), electronic (652), award (654), and others, without limitation. In some examples, band 612 may be associated with an account to which a user may link a credit card, debit card, or other type of payment account that, when properly authenticated, allows for the transmission of data and control signals (not shown) over data connection 642 to payment device 644. In other examples, band 612 may be used to send data that can be translated or interpreted as control signal’s or voltages in order to manage environmental control systems (e.g., heating, ventilation, air conditioning (HVAC), temperature, air filter (e.g., hepa, pollen, allergen), humidify, and others, without limitation). Input detected from one or more of sensors 614-620 may be transformed into data received by band 612. Using firmware, application software, or other user or system-specified parameters, when data associated with input from sensors 614-620 are received, control signals may be generated and sent by band 612 over data connection 642 to environmental control system 646, which may be configured to implement a change to one or more environmental conditions within, for example, a residential, office, commercial, building, structural, or other type of environment. As an example, if sensor 612 detects that a user wearing band 612 has begun running and sensor 618 detects a rise in one or more physiological conditions, band 612 may generate control signals and send these over data connection 642 to environmental control system 646 to lower the ambient air temperature to a specified threshold (as input by a user into an account storing a profile associated with environmental conditions he prefers for running (or another type of activity)) and decreasing humidity to account for increased carbon dioxide emissions due to labored breathing. As another example, sensor 616 may detect that a given user is pregnant due to the detection of an increase in various types of hormonal levels, body temperature, and other biochemical conditions. Using this input against comparing the user's past preferred ambient temperature ranges, band 612 may be configured to generate, without user input, one or more control signals that may be sent to operate electrical motors that are used to open or close window shades and mechanical systems that are used to open or close windows in order to adjust the ambient temperature inside her home before arriving from work. As a further example, sensor 618 may detect that a user has been physiologically confined to a sitting position for 4 hours and sensor 620 has received input indicating that the user is in an irritated psychological state due to an audio sensor (not shown, but implementable as sensor 620) detecting increased noise levels (possibly, due to shouting or elevating voice levels), a temperature sensor (not shown) detecting an increase in body temperature, and a galvanic skin response sensor (not shown) detecting changes in skin resistivity (i.e., a measure of electrical conductivity of skin). Subsequently, band 612, upon receiving this input, may compare this data against a database (either in firmware or remote over data connection 642) and, based upon this comparison, end a control signal to an electrical system to lower internal lighting and another control signal to an electronic audio system to play calming music from memory, compact disc, or the like.

As another example, a user may have an account associated with band 612 and enrolls in a participatory fitness program that, upon achieving certain milestones, results in the receipt of an award or promotion. For example, sensor 614 may detect that a user has associated his account with a program to receive a promotional discount towards the purchase of a portable Bluetooth® communications headset. However, the promotion may be earned once the user has completed, using band 612, a 10 kilometer run at an 8-minute and 30-second per mile pace. Upon first detecting the completion of this event using input from, for example, a GPS sensor (not shown, but implementable as sensor 614), a pedometer, a clock, and an accelerometer, band 612 may be configured to send a signal or data via a wireless connection (i.e., data connection 642) to award system 654, which may be configured to retrieve the desired promotion from another database (e.g., a promotions database, an advertisement server, an advertisement network, or others) and then send the promotion electronically back to band 612 for further display or use (e.g., redemption) on a device in data connection with band 612 (not shown). Other examples of the above-described device types and other device types not shown or described may be implemented and are not limited to those provided.

Figure 6D:
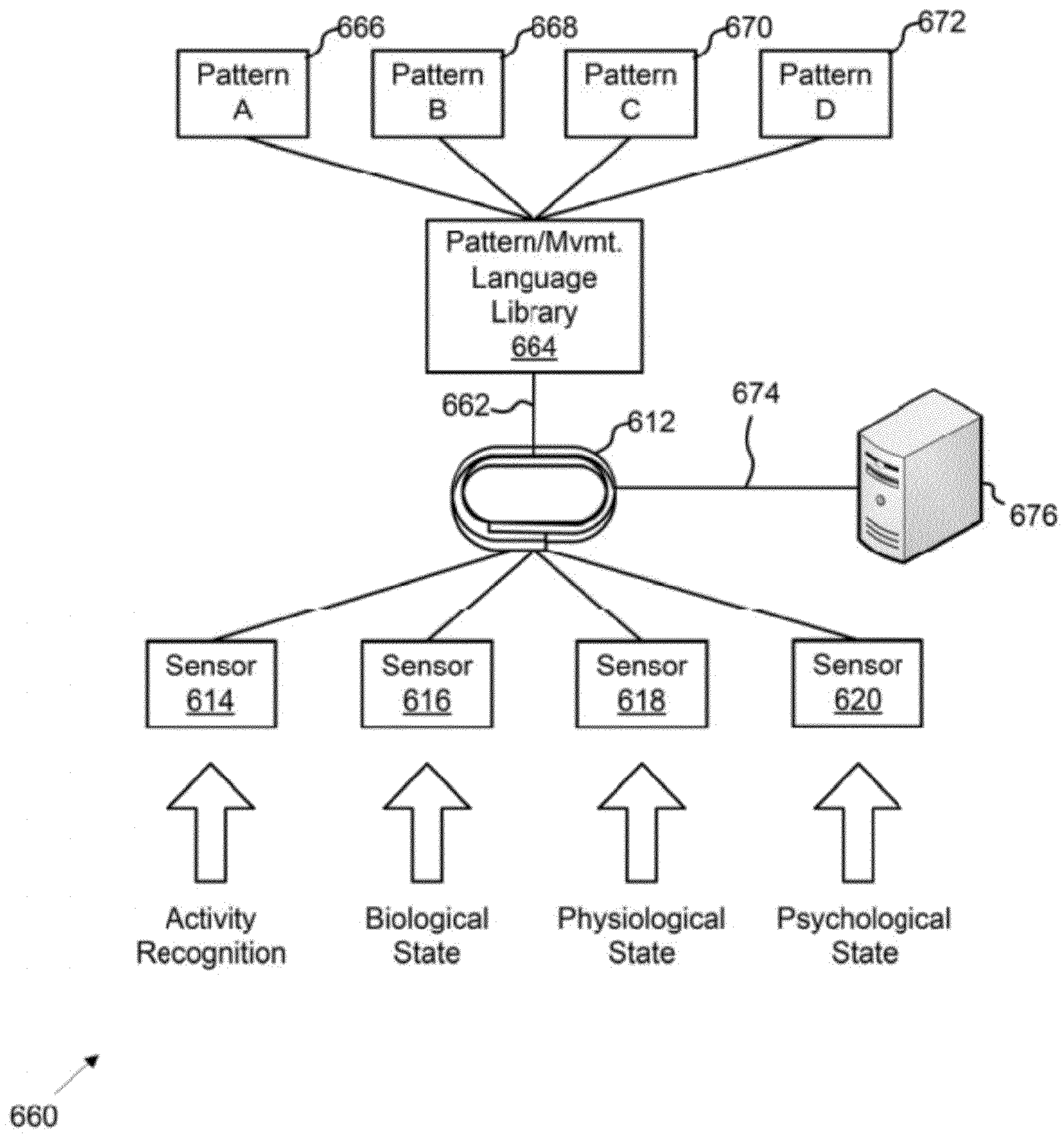
FIG. 6D illustrates an exemplary system for movement languages in wearable devices.

FIG. 6D illustrates an exemplary system for movement languages in wearable devices. Here, system 660 includes band 612, sensors 614-620, data connection 622, pattern/movement language library (i.e., pattern library) 664, patterns 666-672, data connections 662 and 674, and server 676. In some examples, band 612 may be configured to compile a "movement language" that may be stored in pattern library 664, which can be either locally (i.e., in memory on band 612) or remotely (i.e., in a database or other data storage facility that is in data connection with band 612, either via wired or wireless data connections). As used herein, a "movement language" may refer to the description of a given movement as one or more inputs that may be transformed into a discrete set of data that, when observed again, can be identified as correlating to a given movement. In some examples, a movement may be described as a collection of one or more motions. In other examples, biological, psychological, and physiological states or events may also be recorded in pattern library 664. These various collections of data may be stored in pattern library 664 as patterns 666-672.

A movement, when detected by an accelerometer (not shown) on band 612, may be associated with a given data set and used, for example, to perform one or more functions when detected again. Parameters may be specified (i.e., by either a user or system (i.e., automatically or semi-automatically generated)) that also allow for tolerances to determine whether a given movement falls within a given category (e.g., jumping may be identified as a set of data that has a tolerance of +/−0.5 meters for the given individual along a z-axis as input from a 3-axes accelerometer).

Using the various types of sensors (e.g., sensors 614-620), different movements, motions, moods, emotions, physiological, psychological, or biological events can be monitored, recorded, stored, compared, and used for other functions by band 612. Further, movements may also be downloaded from a remote location (e.g., server 676) to band 612. Input provided by sensors 614-620 and resolved into one or more of patterns 666-672 and used to initiate or perform one or more functions, such as authentication (FIG. 6A), playlist management (FIG. 6B), device control (FIG. 6C), among others. In other examples, systems 610, 640, 660 and the respective above-described elements may be varied in design, implementation, configuration, function, structure, or other aspects and are not limited to those provided.

Figure 7A:
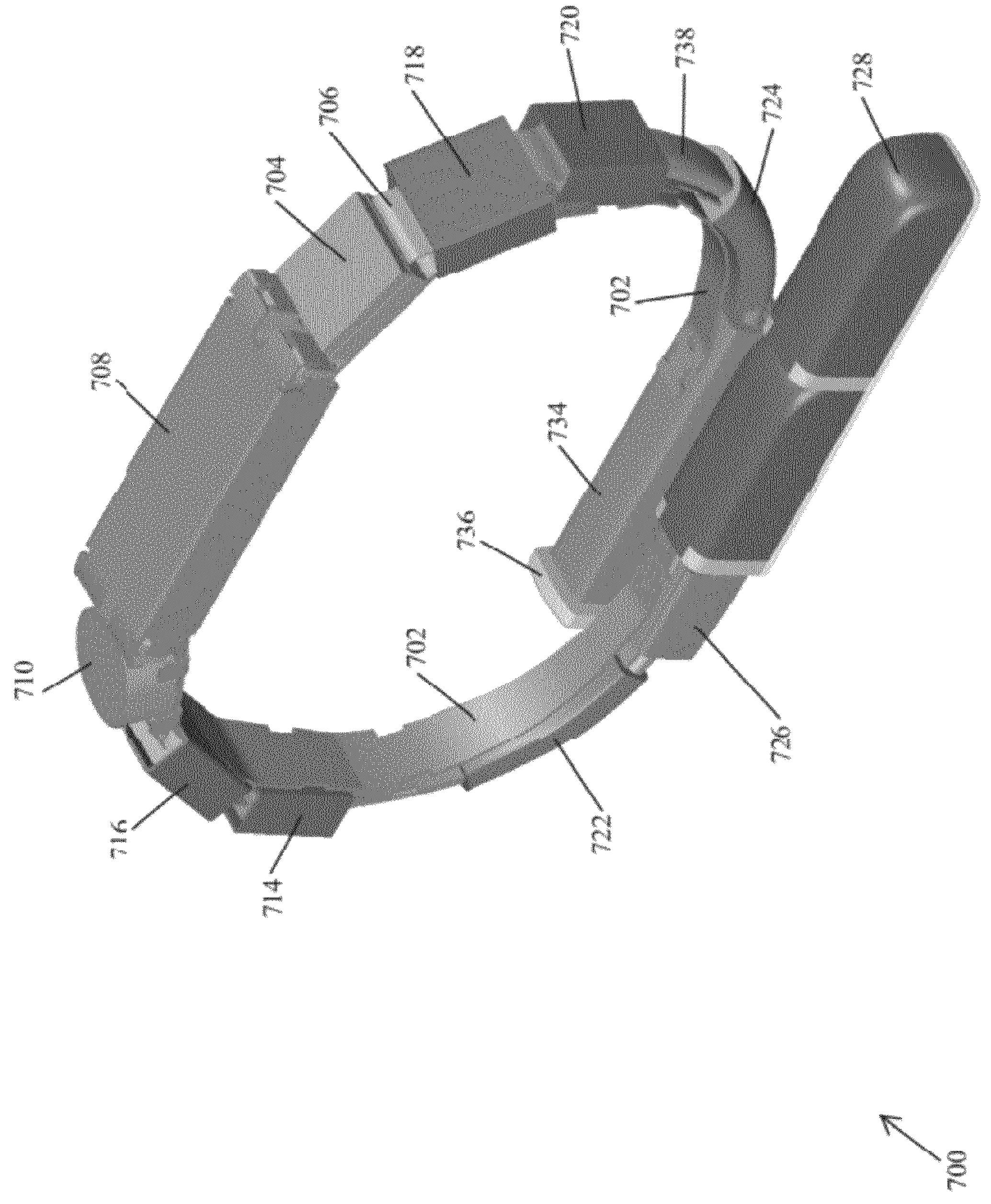
FIG. 7A illustrates a perspective view of an exemplary data-capable strapband.

FIG. 7A illustrates a perspective view of an exemplary data-capable strapband configured to receive overmolding. Here, band 700 includes framework 702, covering 704, flexible circuit 706, covering 708, motor 710, coverings 714-724, plug 726, accessory 728, control housing 734, control 736, and flexible circuits 737-738. In some examples, band 700 is shown with various elements (i.e., covering 704, flexible circuit 706, covering 708, motor 710, coverings 714-724, plug 726, accessory 728, control housing 734, control 736, and flexible circuits 737-738) coupled to framework 702. Coverings 708, 714-724 and control housing 734 may be configured to protect various types of elements, which may be electrical, electronic, mechanical, structural, or of another type, without limitation. For example, covering 708 may be used to protect a battery and power management module from protective material formed around band 700 during an injection molding operation. As another example, housing 704 may be used to protect a printed circuit board assembly ("PCBA") from similar damage. Further, control housing 734 may be used to protect various types of user interfaces (e.g., switches, buttons (e.g., control 736), lights, light-emitting diodes, or other control features and functionality) from damage. In other examples, the elements shown may be varied in quantity, type, manufacturer, specification, function, structure, or other aspects in order to provide data capture, communication, analysis, usage, and other capabilities to band 700, which may be worn by a user around a wrist, arm, leg, ankle, neck or other protrusion or aperture, without restriction. Band 700, in some examples, illustrates an initial unlayered device that may be protected using the techniques for protective overmolding as described above. Alternatively, the number, type, function, configuration, ornamental appearance, or other aspects shown may be varied without limitation.

Figure 7B:
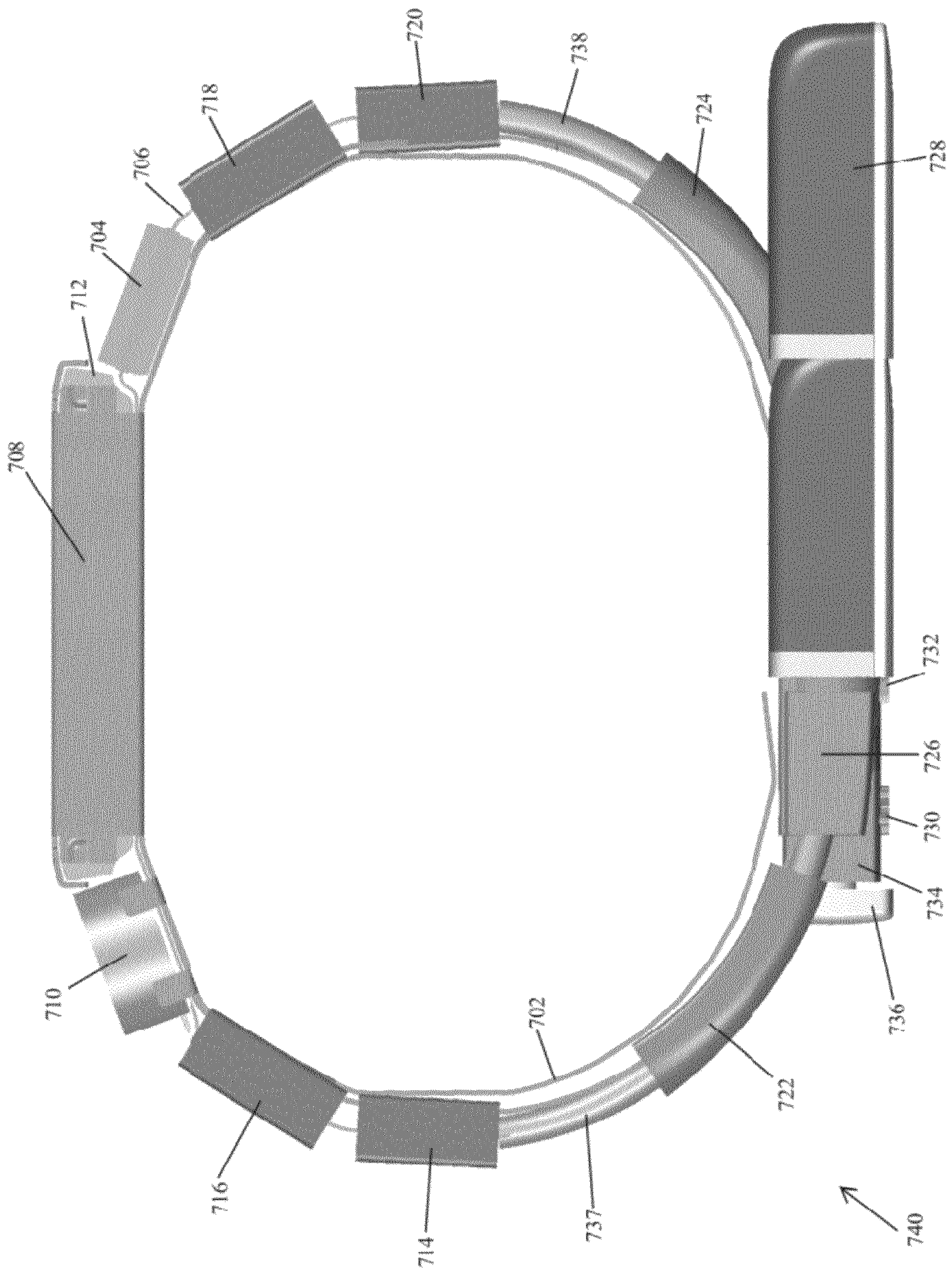
FIG. 7B illustrates a side view of an exemplary data-capable strapband.

FIG. 7B illustrates a side view of an exemplary data-capable strapband. Here, band 740 includes framework 702, covering 704, flexible circuit 706, covering 708, motor 710, battery 712, coverings 714-724, plug 726, accessory 728, button/switch/LED 730-732, control housing 734, control 736, and flexible circuits 737-738 and is shown as a side view of band 700. In other examples, the number, type, function, configuration, ornamental appearance, or other aspects shown may be varied without limitation.

Figure 8A:
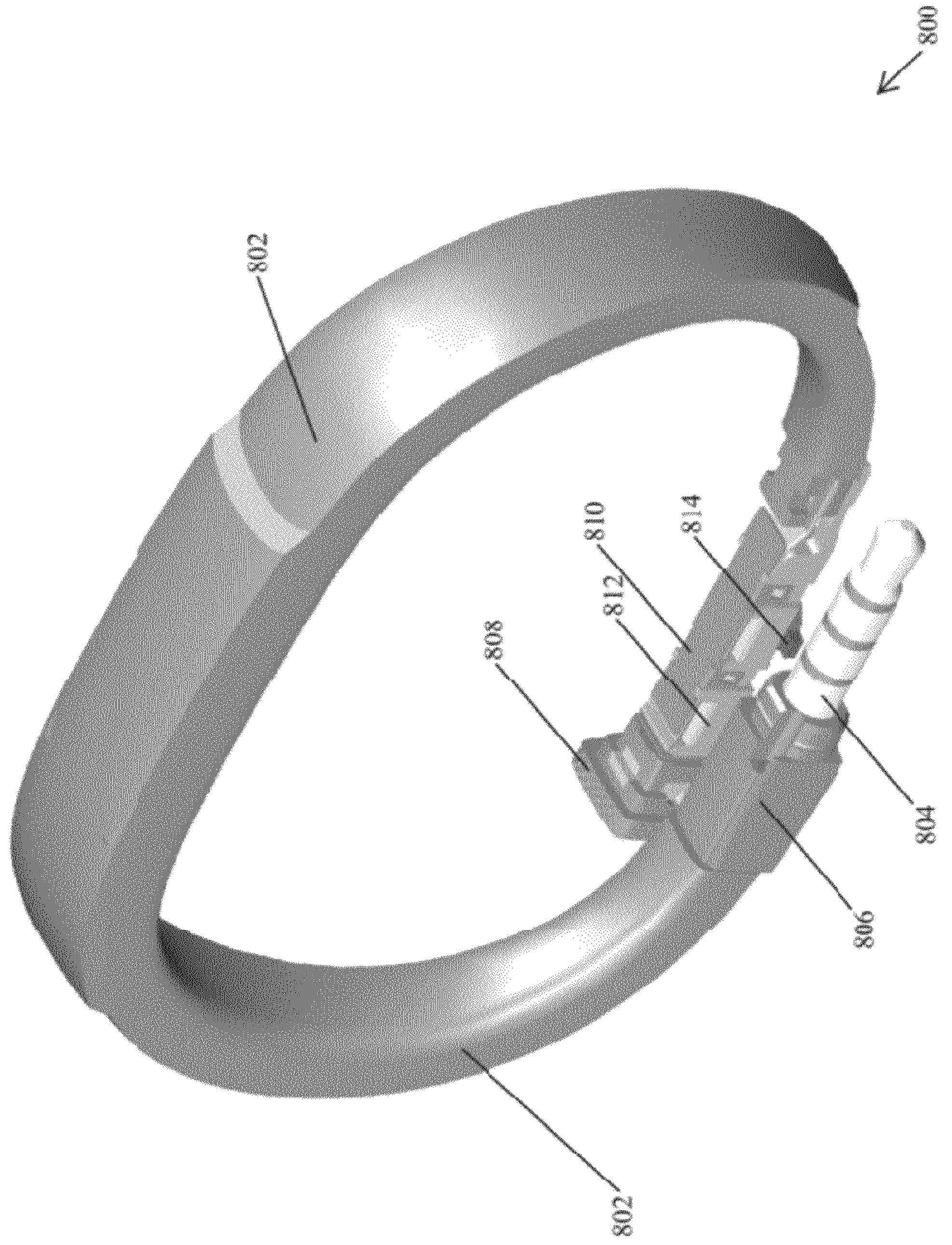
FIG. 8A illustrates a perspective view of an exemplary data-capable strapband.

FIG. 8A illustrates a perspective of an exemplary data-capable strapband having a first molding. Here, an alternative band (i.e., band 800) includes molding 802, analog audio TRRS-type plug (hereafter "plug") 804, plug housing 806, button 808, framework 810, control housing 812, and indicator light 814. In some examples, a first protective overmolding (i.e., molding 802) has been applied over band 700 (FIG. 7) and the above-described elements (e.g., covering 704, flexible circuit 706, covering 708, motor 710, coverings 714-724, plug 726, accessory 728, control housing 734, control 736, and flexible circuit 738) leaving some elements partially exposed (e.g., plug 804, plug housing 806, button 808, framework 810, control housing 812, and indicator light 814). However, internal PCBAs, flexible connectors, circuitry, and other sensitive elements have been protectively covered with a first or inner molding that can be configured to further protect band 800 from subsequent moldings formed over band 800 using the above-described techniques. In other examples, the type, configuration, location, shape, design, layout, or other aspects of band 800 may be varied and are not limited to those shown and described. For example, TRRS plug 804 may be removed if a wireless communication facility is instead attached to framework 810, thus having a transceiver, logic, and antenna instead being protected by molding 802. As another example, button 808 may be removed and replaced by another control mechanism (e.g., an accelerometer that provides motion data to a processor that, using firmware and/or an application, can identify and resolve different types of motion that band 800 is undergoing), thus enabling molding 802 to be extended more fully, if not completely, over band 800. In other examples, the number, type, function, configuration, ornamental appearance, or other aspects shown may be varied without limitation.

Figure 8B:
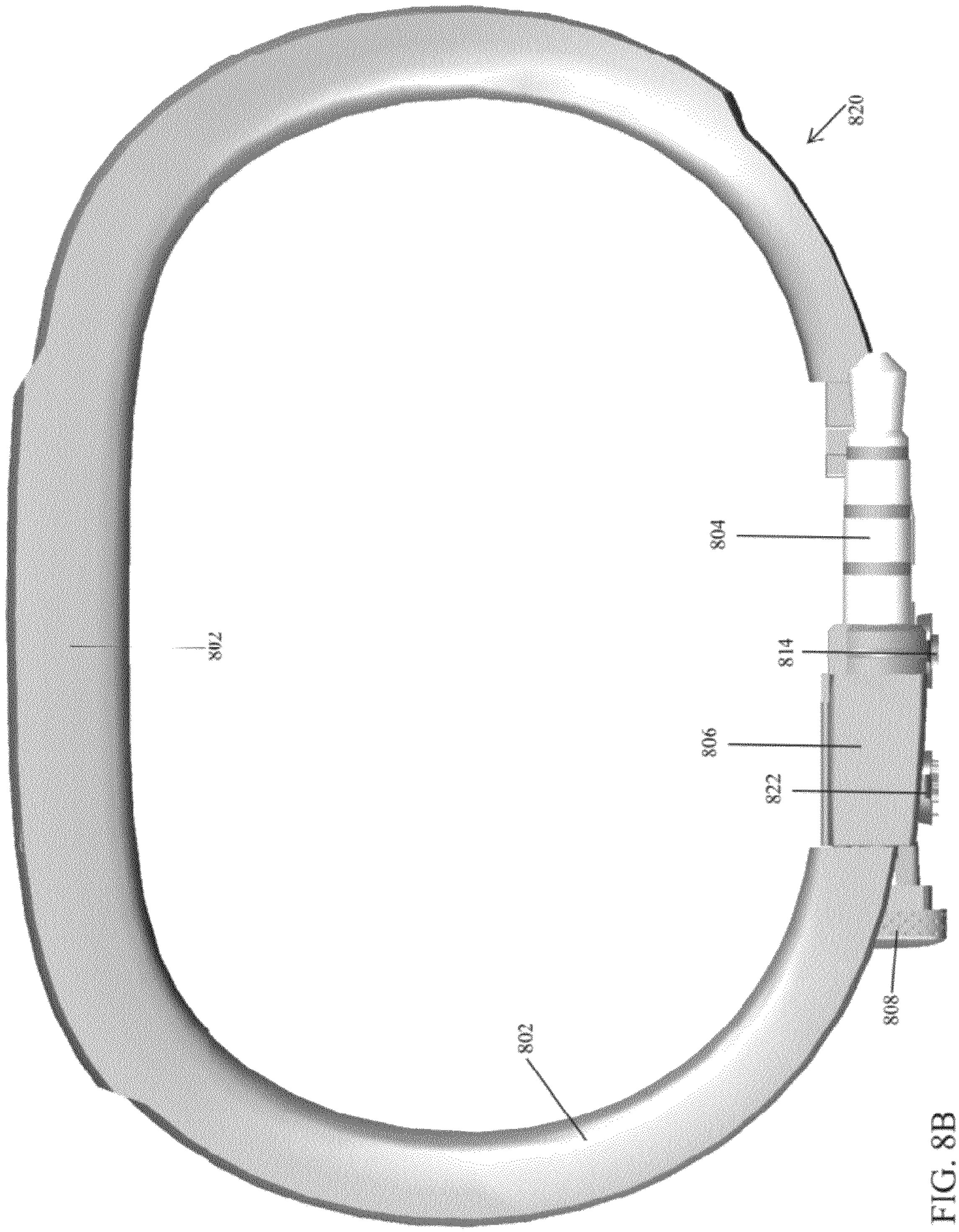
FIG. 8B illustrates a side view of an exemplary data-capable strapband.

FIG. 8B illustrates a side view of an exemplary data-capable strapband. Here, band 820 includes molding 802, plug 804, plug housing 806, button 808, control housing 812, and indicator lights 814 and 822. In other examples, the number, type, function, configuration, ornamental appearance, or other aspects shown may be varied without limitation.

Figure 9A:
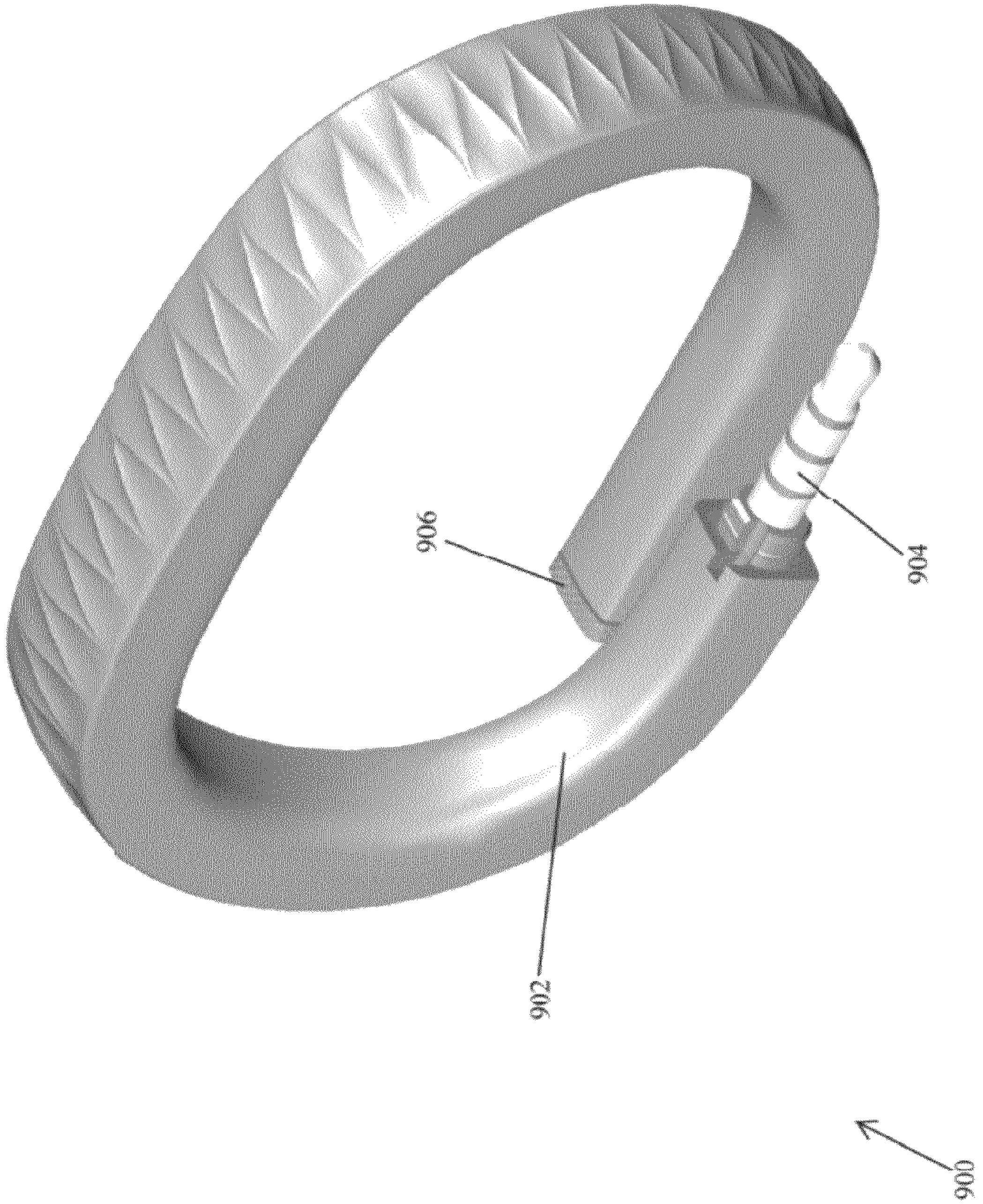
FIG. 9A illustrates a perspective view of an exemplary data-capable strapband.

FIG. 9A illustrates a perspective view of an exemplary data-capable strapband having a second molding. Here, band 900 includes molding 902, plug 904, and button 906. As shown another overmolding or protective material has been formed by injection molding, for example, molding 902 over band 900. As another molding or covering layer, molding 902 may also be configured to receive surface designs, raised textures, or patterns, which may be used to add to the commercial appeal of band 900. In some examples, band 900 may be illustrative of a finished data-capable strapband (i.e., band 700 (FIG. 7), 800 (FIG. 8) or 900) that may be configured to provide a wide range of electrical, electronic, mechanical, structural, photonic, or other capabilities.

Here, band 900 may be configured to perform data communication with one or more other data-capable devices (e.g., other bands, computers, networked computers, clients, servers, peers, and the like) using wired or wireless features. For example, plug 900 may be used, in connection with firmware and software that allow for the transmission of audio tones to send or receive encoded data, which may be performed using a variety of encoded waveforms and protocols, without limitation. In other examples, plug 904 may be removed and instead replaced with a wireless communication facility that is protected by molding 902. If using a wireless communication facility and protocol, band 900 may communicate with other data-capable devices such as cell phones, smart phones, computers (e.g., desktop, laptop, notebook, tablet, and the like), computing networks and clouds, and other types of data-capable devices, without limitation. In still other examples, band 900 and the elements described above in connection with FIGS. 1-9, may be varied in type, configuration, function, structure, or other aspects, without limitation to any of the examples shown and described.

Figure 9B:
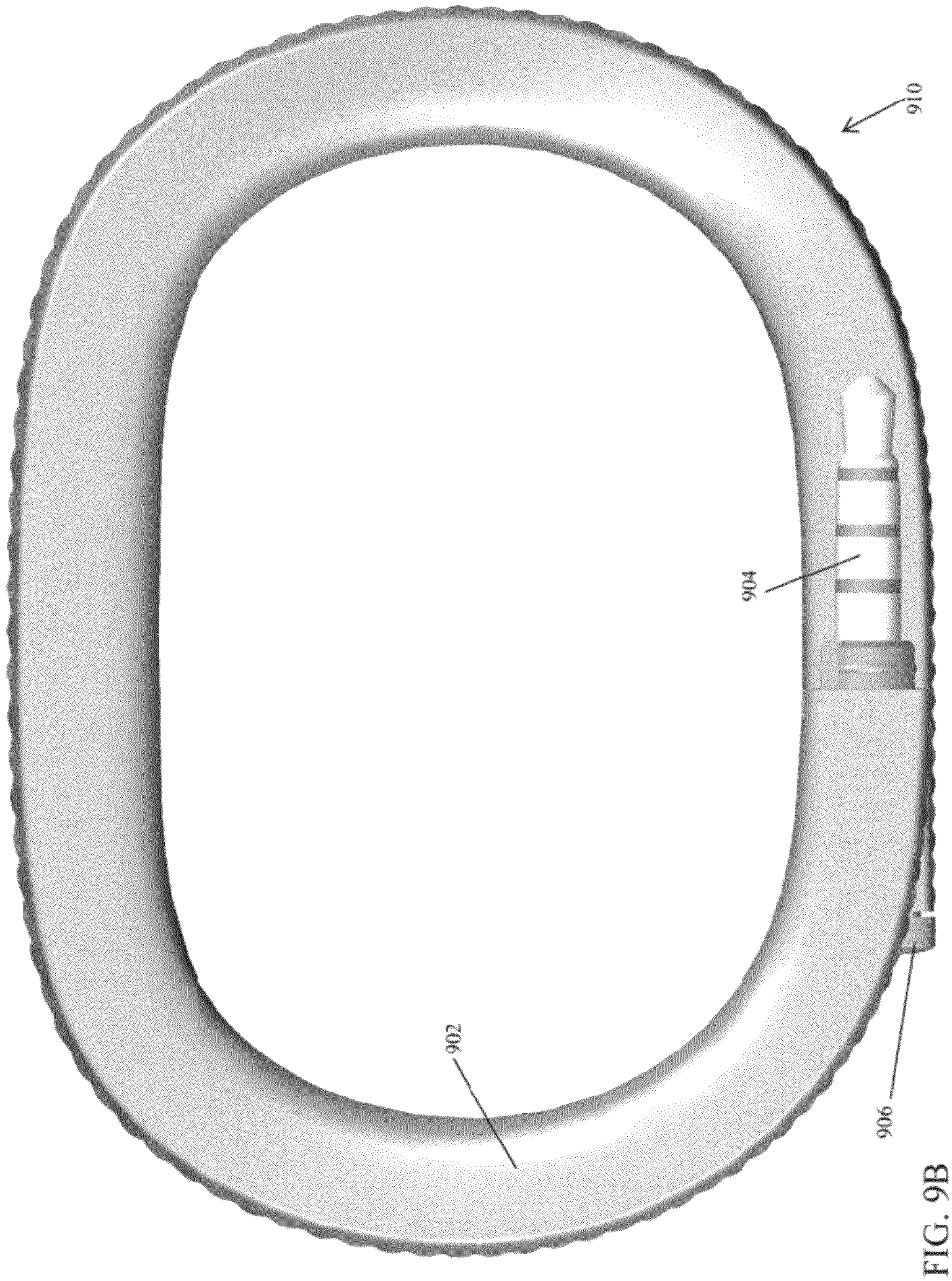
FIG. 9B illustrates a side view of an exemplary data-capable strapband.

FIG. 9B illustrates a side view of an exemplary data-capable strapband. Here, band 910 includes molding 902, plug 904, and button 906. In other examples, the number, type, function, configuration, ornamental appearance, or other aspects shown may be varied without limitation.

Figure 10:
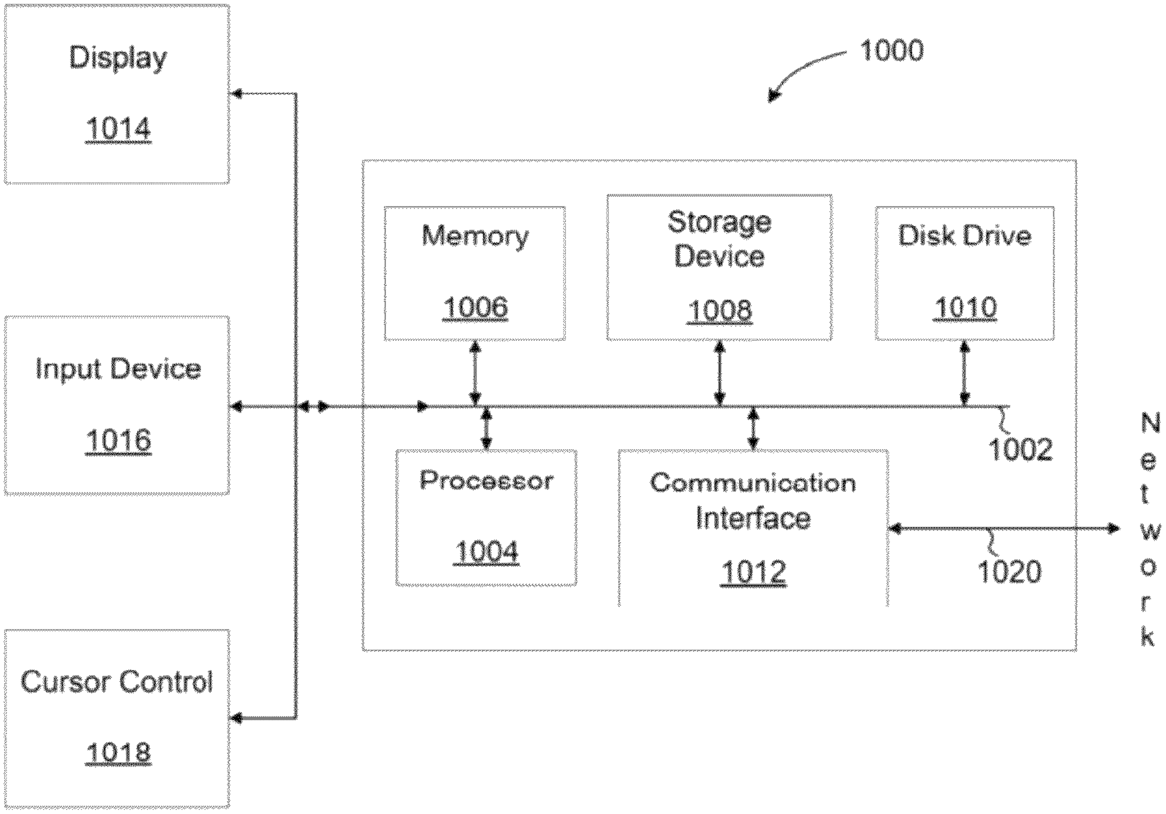
FIG. 10 illustrates an exemplary computer system suitable for use with a data-capable strapband.

FIG. 10 illustrates an exemplary computer system suitable for use with a data-capable strapband. In some examples, computer system 1000 may be used to implement computer programs, applications, methods, processes, or other software to perform the above-described techniques. Computer system 1000 includes a bus 1002 or other communication mechanism for communicating information, which interconnects subsystems and devices, such as processor 1004, system memory 1006 (e.g., RAM), storage device 1008 (e.g., ROM), disk drive 1010 (e.g., magnetic or optical), communication interface 1012 (e.g., modem or Ethernet card), display 1014 (e.g., CRT or LCD), input device 1016 (e.g., keyboard), and cursor control 1018 (e.g., mouse or trackball).

According to some examples, computer system 1000 performs specific operations by processor 1004 executing one or more sequences of one or more instructions stored in system memory 1006. Such instructions may be read into system memory 1006 from another computer readable medium, such as static storage device 1008 or disk drive 1010. In some examples, hard-wired circuitry may be used in place of or in combination with software instructions for implementation.

The term "computer readable medium" refers to any tangible medium that participates in providing instructions to processor 1004 for execution. Such a medium may take many forms, including but not limited to, non-volatile media and volatile media. Non-volatile media includes, for example, optical or magnetic disks, such as disk drive 1010. Volatile media includes dynamic memory, such as system memory 1006.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 1002 for transmitting a computer data signal.

In some examples, execution of the sequences of instructions may be performed by a single computer system 1000. According to some examples, two or more computer systems 1000 coupled by communication link 1020 (e.g., LAN, PSTN, or wireless network) may perform the sequence of instructions in coordination with one another. Computer system 1000 may transmit and receive messages, data, and instructions, including program, i.e., application code, through communication link 1020 and communication interface 1012. Received program code may be executed by processor 1004 as it is received, and/or stored in disk drive 1010, or other non-volatile storage for later execution.

Figure 11A:
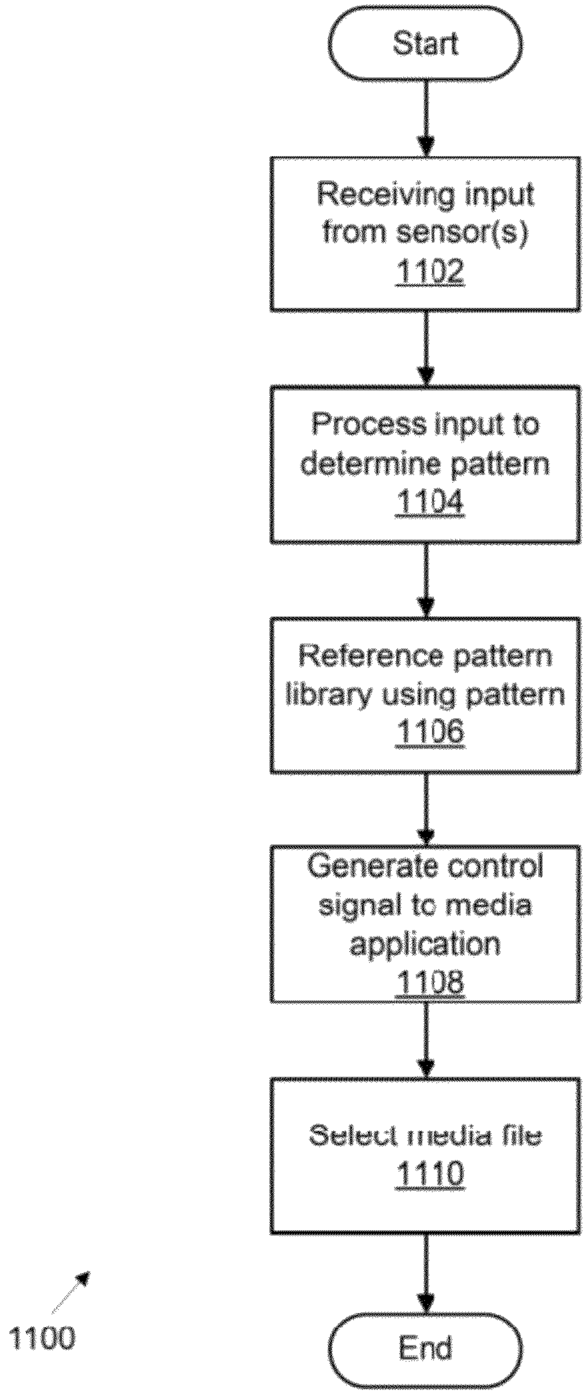
FIG. 11A illustrates an exemplary process for media device content management using sensory input.

FIG. 11A illustrates an exemplary process for media device content management using sensory input. Here, process 1100 begins by receiving an input from one or more sensors that may be coupled to, integrated with, or are remote from (i.e., distributed on other devices that are in data communication with) a wearable device (1102). The received input is processed to determine a pattern (1104). Once a pattern has been determined, then a compare, lookup, or other reference operation may be performed against a pattern library (i.e., a database or other storage facility configured to store data associated with one or more patterns) (1106). As used herein, "pattern library" may be used to store patterns associated with movements, motion, moods, states, activities, events, or any other grouping of data associated with a pattern as determined by evaluating input from one or more sensors coupled to a wearable device (e.g., band 104 (FIG. 1), and others). If a given pattern is found in a pattern library, a control signal relating to the underlying activity or state may be generated and sent by a wearable device to a media application (e.g., an application that may be implemented using hardware, software, circuitry, or a combination thereof) that is configured to present media content (1108). Based on the control signal, a media file may be selected and presented (1110). For example, a given pattern may be recognized by band 612 (FIG. 6A) as a shaking motion that is associated with playing a given list of music files (e.g., playlist). When the pattern is recognized and based on input provided by a user, band 612 may be configured to send a control signal to skip to the next music file (e.g., song) in the playlist. As described in detail above in connection with FIG. 6A, any type of media file, content, or format may be used and is not limited to those described. Further, process 1100 and the above-described elements may be varied in order, function, detail, or other aspects, without limitation to examples provided.

Figure 11B:
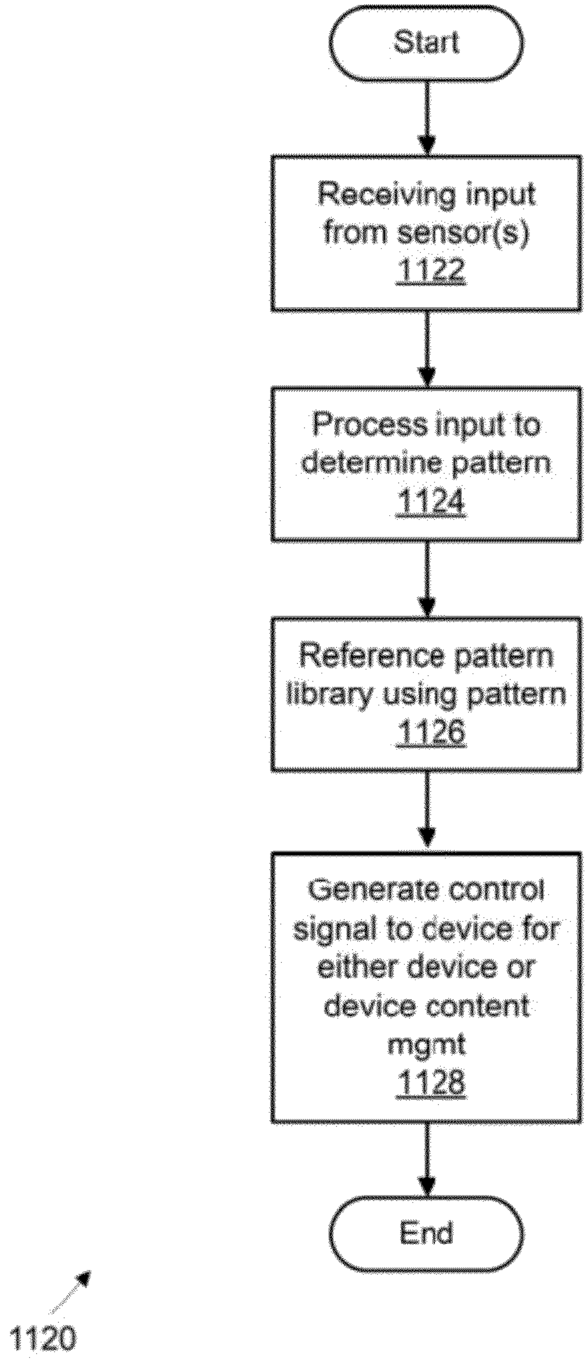
FIG. 11B illustrates an exemplary process for device control using sensory input.

FIG. 11B illustrates an exemplary process for device control using sensory input. Here, process 1120 begins by receiving an input from one or more sensors, which may be coupled to or in data communication with a wearable device (1122). Once received, the input is processed to determine a pattern (1124). Using the determined pattern, an operation is performed to reference a pattern library to determine whether a pre-defined or pre-existing control signal is identified (1126). If a control signal is found that correlates to the determined pattern, then wearable device 612 (FIG. 6A) (e.g., data-capable strapband, or the like) may generate the identified control signal and send it to a given destination (e.g., another device or system in data communication with wearable device 612). If, upon referencing a pattern library, a pre-defined or pre-existing control signal is not found, then another control signal may be generated and sent by wearable device 612. Regardless, after determining a control signal to send using input from one or more sensors, wearable device 612 generates the control signal for transmission to a device to either provide a device or device content control or management function (1128). In other examples, process 1120 and the above-described elements may be varied in order, function, detail, or other aspects, without limitation to examples provided.

Figure 11C:
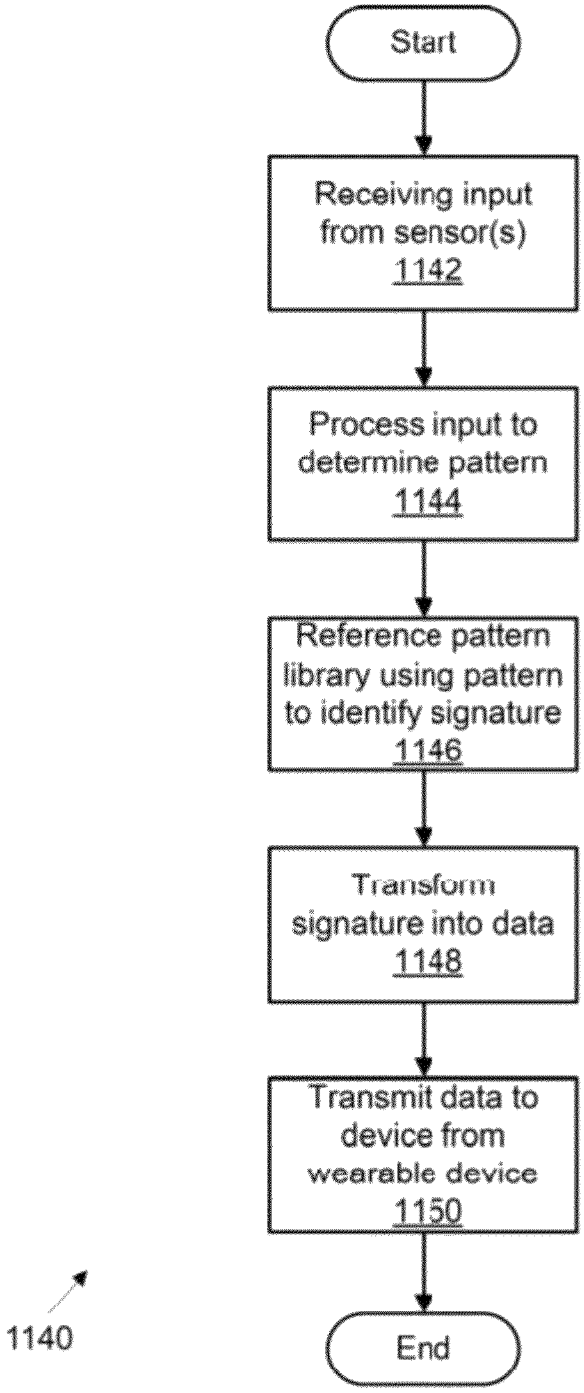
FIG. 11C illustrates an exemplary process for wearable device data security.

FIG. 11C illustrates an exemplary process for wearable device data security. Here, process 1140 begins by receiving an input from one or more sensors, which may be coupled to or in data communication with a wearable device (1142). Once received, the input is processed to determine a pattern (1144). Using the determined pattern, an operation is performed to reference a pattern library to determine whether the pattern indicates a given signature that, for authentication purposes, may be used to perform or engage in a secure transaction (e.g., transferring funds or monies, sending or receiving sensitive personal information (e.g., social security numbers, account information, addresses, spouse/partner/children information, and the like)) (1146). Once identified, the signature may be transformed using various techniques (e.g., hash/hashing algorithms (e.g., MDA, SHA-1, and others, without limitation), checksum, encryption, encoding/decoding, and others, without limitation) into data formatted for transmission from wearable device 612 (FIG. 6A) to another device and/or application (1148). After transforming the signature into data, the data is transmitted from wearable device 612 to another device in data communication with the former (1150). In other examples, the data may be transmitted to other destinations, including intermediate networking routing equipment, servers, databases, data storage facilities, services, web services, and any other type of system or apparatus that is configured to authenticate the signature (i.e., transmitted data), without limitation. In still other examples, process 1140 and the above-described elements may be varied in order, function, detail, or other aspects, without limitation to examples provided.

Figure 11D:
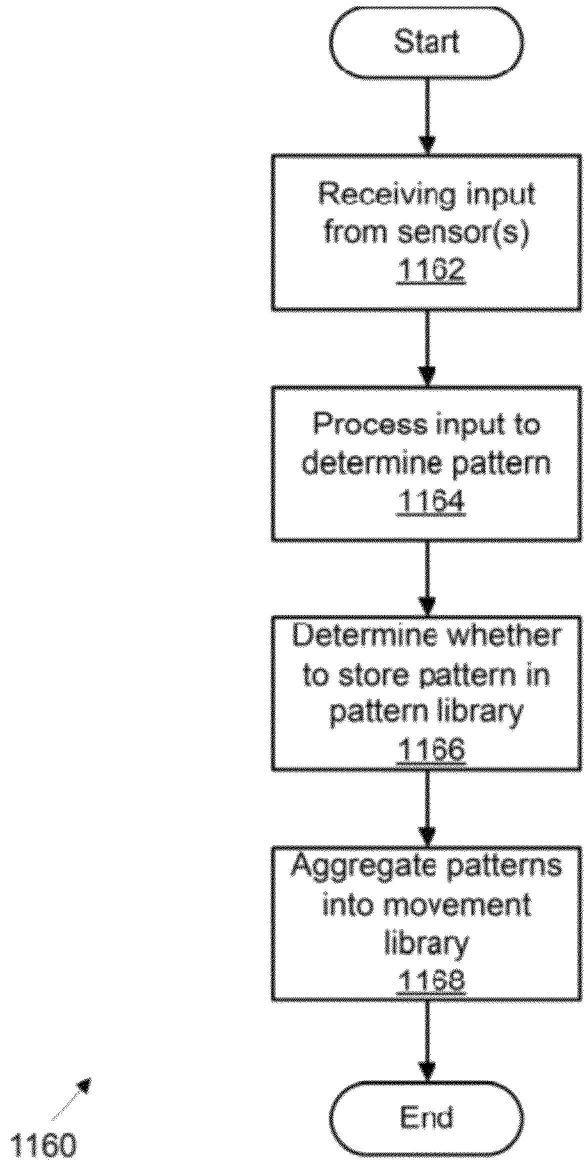
FIG. 11D illustrates an exemplary process for movement languages in wearable devices.

FIG. 11D illustrates an exemplary process for movement languages in wearable devices. Here, process 1160 begins by receiving an input from one or more sensors, which may be coupled to or in data communication with a wearable device (1162). Once received, the input is processed to determine a pattern (1164). An inquiry may be performed to determine whether the pattern has been previously stored and, if not, it is stored as a new record in a database to indicate that a pattern is associated with a given set of movements, motions, activities, moods, states, or the like. If the determined pattern does have a previously stored pattern associated with the same or substantially similar set of sensory inputs (i.e., input received from one or more sensors), then the new pattern may be discarded or used update the pre-defined or pre-existing pattern. In other examples, patterns that conflict with those previously stored may be evaluated differently to determine whether to store a given pattern in a pattern library (1166). After determining whether to store the pattern in a pattern library (i.e., in some examples, more than one pattern library may be stored on wearable device 612 or a remote database that is used by and in data communication with wearable device 612), the patterns may be aggregated in movement library to develop a "movement language" (i.e., a collection of patterns that may be used to interpret activities, states, or other user interactions with wearable device 612 in order to perform various functions, without limitation (612)) (1168). In other examples, process 1160 and the above-described elements may be varied in order, function, detail, or other aspects, without limitation to examples provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed:

1. A method, comprising:

capturing a media control pattern at a wearable device by receiving input from one or more sensors coupled to the wearable device, processing the input to determine the media control pattern, forming an association between the media control pattern and a media control, the media control comprising at least one of a media file selection, a playlist selection, and a player control;

communicating the association and the media control pattern to another wearable device, the wearable device and the another wearable device being worn by different individuals;

receiving data from the another wearable device, determining whether the received data matches the media control pattern, and if the received data matches the media control pattern, generating a control signal to a media application, the control signal comprising the media control associated with the media control pattern.

2. The method of claim 1, further comprising, if the data matches the media control pattern and the media control pattern comprises a media file selection, presenting the selected media file in the media application.

3. The method of claim 2, further comprising capturing another media control pattern at the wearable device by: receiving another input from the one or more sensors, the another input being used to generate another media control pattern, forming another association between the another media control pattern and another media control; and storing the media control pattern, the association, the another media control pattern, and the another association in a pattern library.

4. The method of claim 1, wherein the input comprises data generated from a physical activity.

5. The method of claim 1, wherein the input comprises data associated with at least one of a biological state, a physiological state, and a psychological state.

6. The method of claim 1, wherein at least one of the one or more sensors is at least one of an accelerometer, a motion detector, a clock, an ambient light sensor, a skin resistivity sensor, and a heart rate sensor.

7. The method of claim 1, wherein at least one of the one or more sensors is configured to detect a motion, the motion being configured to initiate generation of the control signal.

8. The method of claim 7, wherein at least one of the one or more sensors is configured to detect another motion, the another motion being configured to stop presentation of the media file and to initiate generation of another control signal configured to select another media file.

9. The method of claim 1, wherein the wearable device is a data-capable strapband, the data-capable strapband comprising a wearable housing containing the one or more sensors, a memory configured to store a pattern library, a communication interface configured to communicate with the another wearable device, an interface to the media application, and a processor configured to perform the capturing, the communicating, the receiving, and the generating.

10. A system, comprising:

a memory configured to store data associated with an input received from one or more sensors coupled to a wearable device, data received from another wearable device, and a pattern library;

a communication facility configured to communicate with another wearable device; and a processor configured to receive input from the one or more sensors, to process the input to determine a media control pattern, to associate the media control pattern with a media control, the media control comprising at least one of a media file selection, a playlist selection, and a player control, to store the association and the media control pattern in the pattern library, to communicate the association and the media control pattern to the another wearable device, the wearable device and the another wearable device being worn by different individuals, to receive data from the another wearable device, to determine whether the received data matches the media control pattern, and if the received data matches the media control pattern, generating a control signal to a media application, the control signal comprising the media control associated with the media control pattern.

11. The system of claim 10, wherein the media application is disposed in a wireless speaker.

12. The system of claim 10, wherein the one or more sensors is disposed at a first location and the media application is disposed at a second location.

13. The system of claim 12, wherein the second location comprises a mobile computing device.

14. A computer program product embodied in a non-transitory computer readable medium and comprising computer instructions for:

capturing a media control pattern at a wearable device by: receiving input from one or more sensors coupled to the wearable device, processing the input to determine the media control pattern, forming an association between the media control pattern and a media control, the media control comprising at least one of a media file selection, a playlist selection, and a player control;

communicating the association and the media control pattern to another wearable device, the wearable device and the another wearable device being worn by different individuals;

receiving data from the another wearable device, determining whether the received data matches the media control pattern, and if the received data matches the media control pattern, generating a control signal to a media application, the control signal comprising the media control associated with the media control pattern.

15. The method of claim 1, wherein the media control pattern comprises a set of sensor data outputs received from the one or more sensors.

16. The method of claim 1, further comprising presenting the media file in the media application after being selected using the control signal.

17. The method of claim 1, wherein the media control pattern comprises a sequence of motion sensor data outputs representing a hand movement.

18. The method of claim 1, wherein the media file selection is configured to select one of a plurality of media files.

19. The method of claim 1, wherein the player control comprises an instruction to the media application to perform at least one of: playing the media file, changing to another media file, skipping the playing of the media file, playing a playlist, changing the playlist, and playing from a different spot in the media file.

20. The method of claim 1, further comprising pressing a button on the wearable device to initiate the capturing of the media control pattern.

* * * * *